(12) United States Patent
Sawamura et al.

(10) Patent No.: US 6,478,431 B1
(45) Date of Patent: Nov. 12, 2002

(54) ILLUMINATION SYSTEM AND PROJECTOR

(75) Inventors: Shigeru Sawamura, Sakai (JP);
Yasumasa Sawai, Yamatotakada (JP);
Hideki Nagata, Kobe (JP)

(73) Assignee: Minolta Co., Ltd., Osaka (JP)

( * ) Notice: Subject to any disclaimer, the term of this patent is extended or adjusted under 35 U.S.C. 154(b) by 26 days.

(21) Appl. No.: 09/705,044

(22) Filed: Nov. 2, 2000

(30) Foreign Application Priority Data

Nov. 11, 1999 (JP) .......................................... 11-321408

(51) Int. Cl.[7] .............................................. G03B 21/28
(52) U.S. Cl. .............................. 353/81; 353/84; 353/99
(58) Field of Search .............................. 353/81, 84, 98, 353/99; 348/743

(56) References Cited

U.S. PATENT DOCUMENTS

| | | | |
|---|---|---|---|
| 5,657,036 A | 8/1997 | Markandey et al. | 345/85 |
| 5,737,038 A | 4/1998 | Gale et al. | 348/759 |
| 5,812,303 A | 9/1998 | Hewlett et al. | 359/298 |
| 5,863,125 A | 1/1999 | Doany | 353/84 |
| 5,909,204 A | 6/1999 | Gale et al. | 345/85 |
| 6,203,160 B1 * | 3/2001 | Ho | 353/84 |
| 6,252,636 B1 * | 6/2001 | Bartlett | 353/743 |

FOREIGN PATENT DOCUMENTS

JP 11-30712 A 2/1999

* cited by examiner

*Primary Examiner*—W. B. Perkey
(74) *Attorney, Agent, or Firm*—Sidley Austin Brown & Wood LLP

(57) ABSTRACT

An illumination system has a light source for emitting illumination light, a color wheel, a first deflecting member, and a second deflecting member. The color wheel transmits or reflects the illumination light while rotating about a rotation axis in such a way that illumination light exiting from the color wheel has colors that are switched sequentially with time. The first deflecting member deflects the illumination light in such a way that the illumination light enters the color wheel. The second deflecting member deflects the illumination light having exited from the color wheel. The illumination light entering the first deflecting member and the illumination light exiting from the second deflecting member are both substantially perpendicular to the rotation axis of the color wheel.

27 Claims, 26 Drawing Sheets

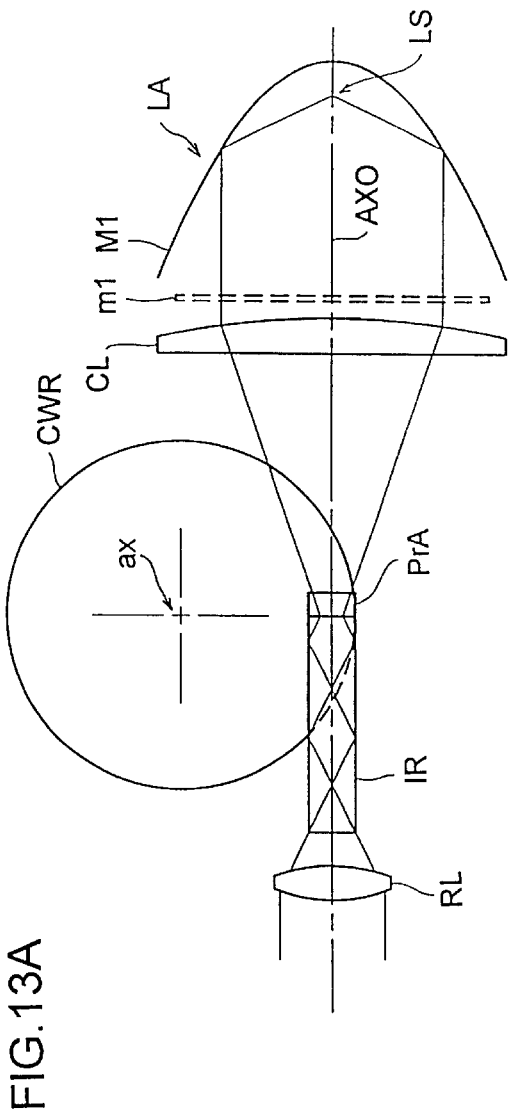
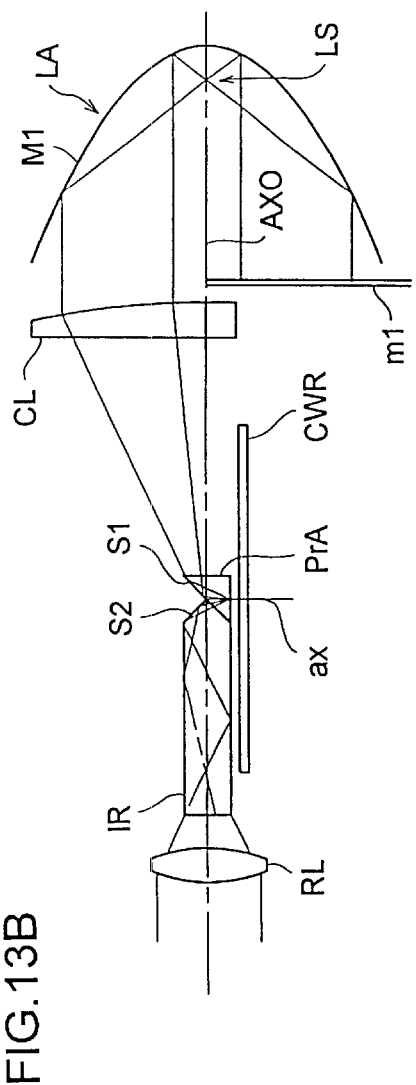
FIG.13A
FIG.13B

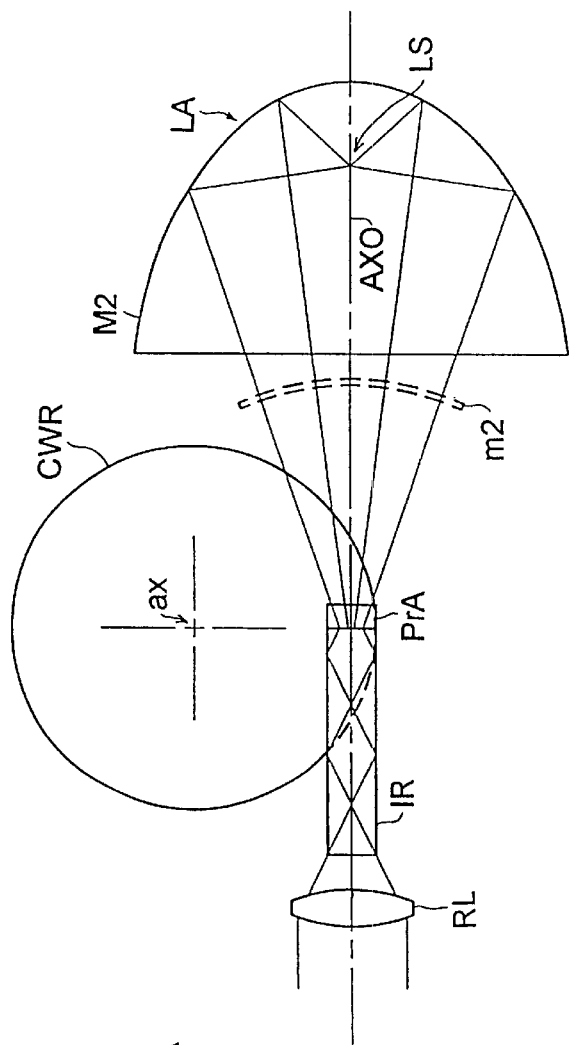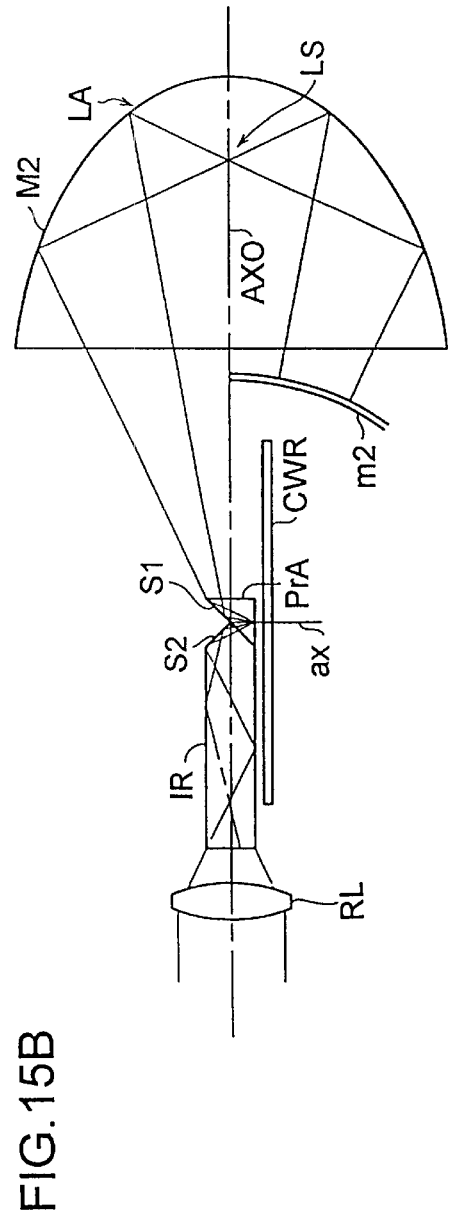
FIG.15A
FIG.15B

ILLUMINATION SYSTEM AND PROJECTOR

This application is based on application No. H11-321408 filed in Japan on Nov. 11, 1999, the entire contents of which are hereby incorporated by reference.

BACKGROUND OF THE INVENTION

1. Field of the Invention

The present invention relates to an illumination system and a projector employing it, and more particularly to an illumination system provided with a color wheel that permits projection of color images and to a projector employing such an illumination system so as to be able to project color images.

2. Description of the Prior Art

FIGS. 24 and 25 show the optical construction of a conventional projector. FIG. 24 is a front view of the projector as seen from the back side of the DMD™ (Digital Micromirror Device™ manufactured by Texas Instruments Incorporated) (3) provided therein as a display device, and FIG. 25 is a top view of the projector as seen from above. This projector has an illumination system, a DMD™ (3) for modulating the illumination light emitted from the illumination system, and a projection optical system (4) for projecting the light modulated by the DMD™ (3). The illumination system is composed of a lamp (LA), a transmission-type color wheel (CWT), an integrator rod (IR), a first to a third relay lens (RL1~RL3), a turning prism (1), and a TIR (total internal reflection) prism (2).

The illumination light emitted from the lamp (LA) first passes through the color wheel (CWT). The color wheel (CWT) is composed of a plurality of color filters transmitting light of different colors (such as R, G, and B), and is so constructed as to rotate, by the action of a motor or the like, about a rotation axis (ax) in such a way that the DMD™ (3) is illuminated with light of colors sequentially switched with time. The illumination light having exited from the color wheel (CWT) is, by passing through the integrator rod (IR), made uniform in terms of its brightness distribution on the display surface of the DMD™ (3). The illumination light having exited from the integrator rod (IR) passes through the first and second relay lenses (RL1, RL2), and then enters the turning prism (1) having the shape of a quadrangular prism. The illumination light having entered the turning prism (1) is totally reflected from a reflecting surface (RT), is then mirror-reflected from a reflecting surface (RM), and is then transmitted through the reflecting surface (RT) so as to exit from the turning prism (1).

The illumination light having been deflected by the turning prism (1) passes through the third relay lens (RL3), and then enters the TIR prism (2), where the illumination light has its direction turned. The TIR prism (2) is composed of a first prism (2a) and a second prism (2b)(FIG. 25), and serves to separate light traveling toward and away from the DMD™ (3). To the first prism (2a), the third relay lens (RL3) is cemented so that the illumination light having passed through the third relay lens (RL3) directly enters the first prism (2a). The illumination light having entered the first prism (2a) is totally reflected from a reflecting surface facing the second prism (2b) those surfaces of the first prism (2a) and the second prism (2b) that face each other are arranged substantially parallel to each other with a predetermined air gap secured in between, and then illuminates the DMD™ (3) from an oblique direction at an angle of 45° relative thereto. Then, the illumination light is optically modulated by being reflected from the DMD™ (3).

The DMD™ (3) is so constructed that each of the micromirrors provided therein is in one of two differently inclined states, namely either in an ON state or in an OFF state. The micromirrors in their ON state reflect the illumination light toward the inside of the projection optical system (4), and the micromirrors in their OFF state reflect the illumination light toward the outside of the projection optical system (4). Thus, the portion of the illumination light reflected by the micromirrors in their ON state passes through the TIR prism (2), i.e. first the first prism (2a) and then the second prism (2b), then enters the projection optical system (4), and eventually forms a display image on a projection surface (not shown).

Nowadays, there is a keen demand for slim and compact mobile projectors on the market. However, in the case of the conventional projector described above, because the color wheel (CWT) is arranged vertically so as to jut upward or downward (FIG. 24), even if the other components are miniaturized in the vertical direction, it is impossible to make the entire projector slimmer. This is true also in cases where a reflection-type color wheel is used. With a color wheel (CWT) having a smaller diameter, the illumination system can be made accordingly slimmer and thus the entire projector can be made accordingly slimmer. However, the smaller the diameter of the color wheel (CWT) is made, the more serious the problem described below becomes.

Assume that, as shown in FIG. 26A, the color wheel (CWT) is composed of three color filters (F1~F3) transmitting light of different colors, namely R, G, and B. In this case, when the illumination light (LB) enters the boundary between two color filters, the illumination light (LB) exiting therefrom has mixed colors. This degrades the color purity of the projected image. If the DMD™ (3) is kept in an OFF state while the illumination light (LB) is passing through a portion around the boundary between two color filters (F1~F3) (e.g. the portion indicated as "off area" in FIG. 26A, such mixing of colors can be prevented. However, while the DMD™ (3) is in its OFF state, no image is projected. In addition, as shown in FIG. 26B, the smaller the diameter of the color wheel (CWT) is made, the greater the ratio of the angle of the area in which the DMD™ (3) needs to be kept in its OFF state (off area) to the angle of the entire color wheel (CWT). This makes the projected image dimmer. In this way, making the diameter of the color wheel (CWT) smaller causes degradation in brightness or color purity of the projected image, and therefore expectations are high for a method that permits a projector to be made slimmer without making the diameter of the color wheel (CWT) used therein smaller.

SUMMARY OF THE INVENTION

A first object of the present invention is to provide an illumination system for use in a projector which permits the projector to be made slimmer without making the diameter of the color wheel used therein smaller. A second object of the present invention is to provide a slim and compact projector employing such an illumination system so as to offer projected images without degradation in brightness or color purity.

To achieve the above object, according to one aspect of the present invention, an illumination system is provided with: a light source for emitting illumination light, a color wheel that transmits or reflects the illumination light while rotating about a rotation axis in such a way that illumination light exiting from the color wheel has colors that are switched sequentially with time, a first deflecting member for deflecting the illumination light in such a way that the illumination light enters the color wheel, and a second deflecting member for deflecting the illumination light having exited from the color wheel, wherein the illumination light entering the first deflecting member and the illumination light exiting from the second deflecting member are both substantially perpendicular to the rotation axis of the color wheel.

According to another aspect of the present invention, a projector is provided with: a light source for emitting illumination light; a color wheel that transmits or reflects the illumination light while rotating about a rotation axis in such a way that illumination light exiting from the color wheel has colors that are switched sequentially with time; a first deflecting member for deflecting the illumination light in such a way that the illumination light enters the color wheel; a second deflecting member for deflecting the illumination light having exited from the color wheel, a spatial light modulation device that is illuminated with the illumination light exiting from the color wheel and that modulates illumination light so as to emit the modulated illumination light as an image light; and a projection optical system for projecting the image light modulated by the spatial light modulation device onto a projection surface located at a predetermined distance, wherein the illumination light entering the first deflecting member and the illumination light exiting from the second deflecting member are both substantially perpendicular to the rotation axis of the color wheel.

BRIEF DESCRIPTION OF THE DRAWINGS

This and other objects and features of this invention will become clear from the following description, taken in conjunction with the preferred embodiments with reference to the accompanied drawings in which:

FIGS. 13A and 13B are optical construction diagrams showing the illumination system of a thirteenth embodiment of the invention;

FIGS. 15A and 15B are optical construction diagrams showing the illumination system of a fifteenth embodiment of the invention;

DESCRIPTION OF THE PREFERRED EMBODIMENTS

Hereinafter, illumination systems and projectors embodying the present invention will be described with reference to the drawings. It is to be noted that, in the following descriptions, such elements as find their counterparts (i. e. elements serving the same or corresponding functions) in the conventional examples described earlier (FIGS. 24, 25, 26A, and 26B) or between different embodiments of the invention are identified with the same reference symbols, and overlapping explanation will be omitted.

Figure 1C:
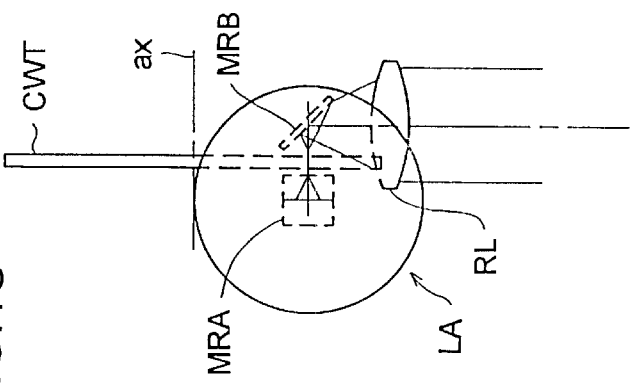
FIGS. 1A to 1C are optical construction diagrams showing the illumination system of a first embodiment of the invention.
Figure 1A:
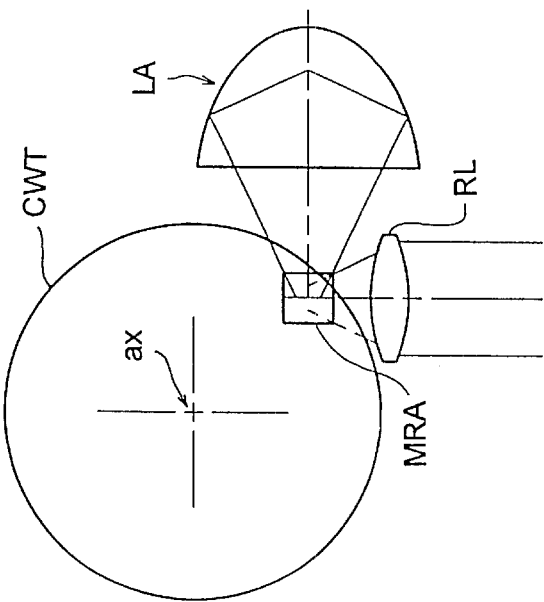
Figure 1B:
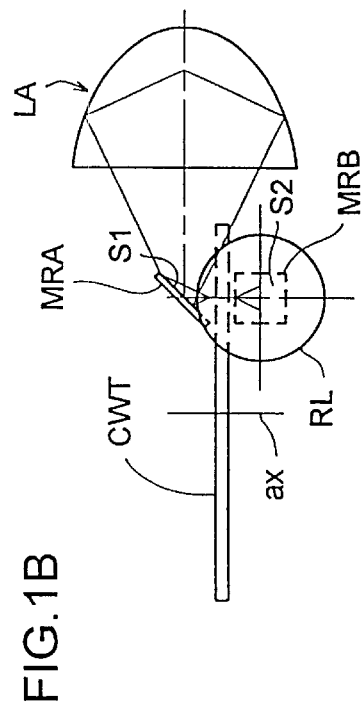

First Embodiment (No. 1, FIGS. 1A to 1C)

FIGS. 1A to 1C show the illumination system of a first embodiment of the invention. Of these figures, FIG. 1A is a top view, FIG. 1B is a front view, and FIG. 1C is a side view. This illumination system for use in a projector has a lamp (LA) for emitting illumination light, a transmission-type color wheel (CWT) for transmitting the illumination light in such a way that light of colors sequentially switched with time is transmitted therethrough, a first deflecting mirror (MRA) for deflecting the illumination light before entering the color wheel (CWT), a second deflecting mirror (MRB) for deflecting the illumination light after exiting from the color wheel (CWT), and a relay optical system (RL).

The first deflecting mirror (MRA), which serves as a first deflecting member, has a first reflecting surface (S1), and the illumination light before entering the color wheel (CWT) is deflected by being reflected from this first reflecting surface (S1). On the other hand, the second deflecting mirror (MRB), which serves as a second deflecting member, has a second reflecting surface (S2), and the illumination light after being transmitted through the color wheel (CWT) is deflected by being reflected from this second reflecting surface (S2). Both the first and second deflecting mirrors (MRA, MRB) are flat mirrors, the first and second reflecting surfaces (S1, S2) being their mirror surfaces.

The illumination light emitted from the lamp (LA) is reflected from the first reflecting surface (S1) of the first deflecting mirror (MRA) and is then transmitted through the color wheel (CWT). The color wheel (CWT) is composed of a plurality of color filters transmitting light of different colors (such as R, G, and B), and is so constructed as to rotate, by the action of a motor or the like, about a rotation axis (ax) in such a way that a display device (not shown) is illuminated with light of colors sequentially switched with time. The illumination light transmitted through the color wheel (CWT) is reflected from the second reflecting surface (S2) of the second deflecting mirror (MRB) and then passes through the relay optical system (RL).

In the first embodiment, where the color wheel (CWT) is of a transmission type, the illumination light entering the first deflecting member and the illumination light exiting from the second deflecting member are both substantially perpendicular to the rotation axis (ax) of the color wheel (CWT). As long as this perpendicular relationship is fulfilled between the color wheel (CWT) and the optical path of the illumination light, the color wheel (CWT) can be arranged horizontally without jutting upward or downward. With the color wheel (CWT) arranged horizontally, it is possible to realize a slimmer illumination system without making the diameter of the color wheel (CWT) smaller. Thus, employing this illumination system makes it possible to realize slim and compact mobile projectors for which there is a keen demand on the market. In addition, since there is no need to make the diameter of the color wheel (CWT) smaller in making projectors slimmer (i.e. smaller in height), it is possible to obtain projected images without degradation in brightness or color purity.

Figure 2:
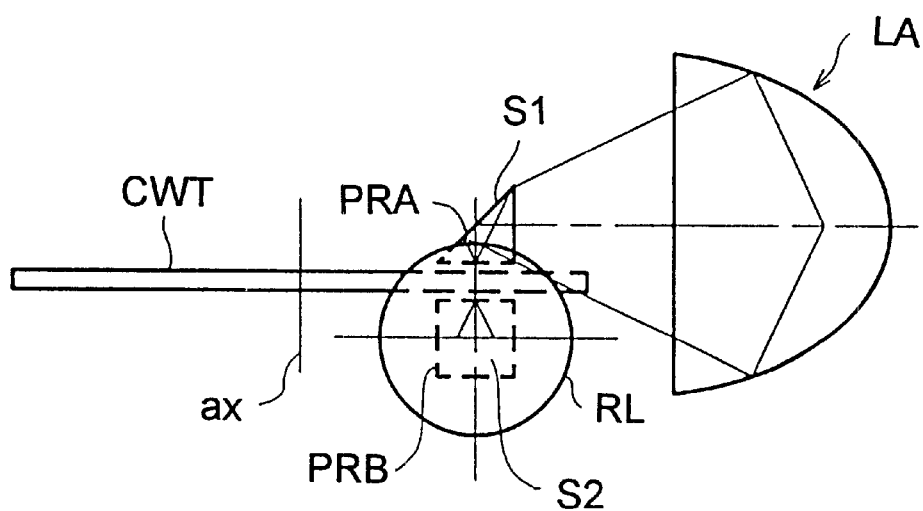
FIG. 2 is an optical construction diagram showing the illumination system of a second embodiment of the invention.

Second Embodiment (No. 2, FIG. 2)

FIG. 2 shows the illumination system of a second embodiment of the invention. FIG. 2 is a front view, and as this figure shows, this illumination system for use in a projector has a lamp (LA) for emitting illumination light, a transmission-type color wheel (CWT), a first deflecting prism (PRA) for deflecting the illumination light before entering the color wheel (CWT), a second deflecting prism (PRB) for deflecting the illumination light after exiting from the color wheel (CWT), and a relay optical system (RL).

The distinctive feature of this embodiment is that the first deflecting prism (PRA) serves as a first deflecting member and the second deflecting prism (PRB) serves as a second deflecting member. In other respects, the construction here is the same as in the first embodiment (FIGS. 1A to 1C) described previously. The first deflecting prism (PRA) has a first reflecting surface (S1), and the illumination light before entering the color wheel (CWT) is deflected by being reflected from this first reflecting surface (S1). On the other hand, the second prism (PRB) has a second reflecting surface (S2), and the illumination light after being transmitted through the color wheel (CWT) is deflected by being reflected from this second reflecting surface (S2). Both the first and second reflecting surfaces (S1, S2) are mirror-coated surfaces having a metal vapor-deposited thereon, and they deflect the illumination light in the same manner as in the first embodiment. In addition, the illumination light entering the first deflecting prism (PRA) and the illumination light exiting from the second deflecting prism (PRB) are both substantially perpendicular to the rotation axis of the color wheel (CWT). This makes it possible to realize a slim projector as in the first embodiment.

Figure 3C:
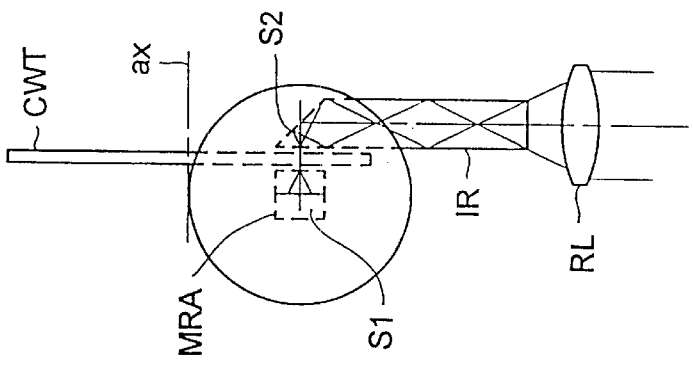
FIGS. 3A to 3C are optical construction diagrams showing the illumination system of a third embodiment of the invention.
Figure 3A:
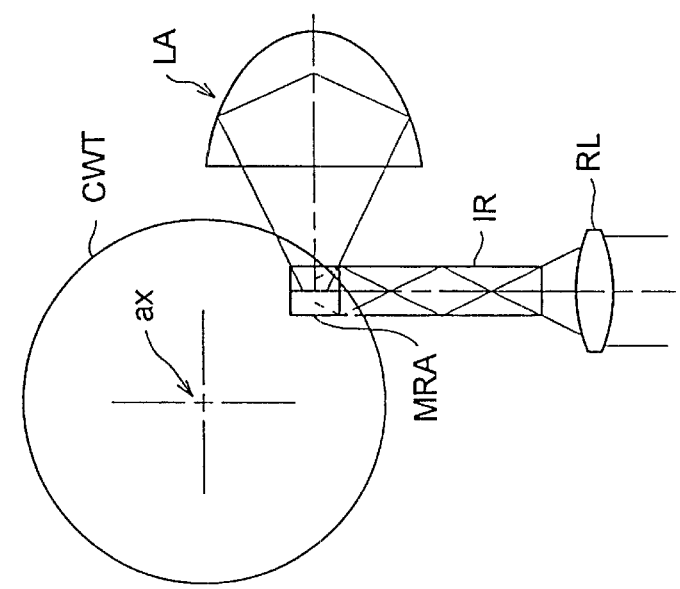
Figure 3B:
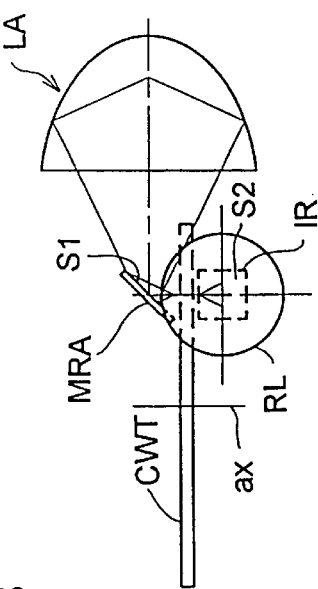

Third Embodiment (No. 3, FIGS. 3A to 3C)

FIGS. 3A to 3C show the illumination system of a third embodiment of the invention. FIG. 3A is a top view, FIG. 3B is a front view, and FIG. 3C is a side view. This illumination system for use in a projector has a lamp (LA) for emitting illumination light, a transmission-type color wheel (CWT), a first deflecting mirror (MRA) for deflecting the illumination light before entering the color wheel (CWT), an integrator rod (IR) for deflecting the illumination light after exiting from the color wheel (CWT) and for making its spatial energy distribution uniform, and a relay optical system (RL).

The distinctive feature of this embodiment is that the integrator rod (IR) having a second reflecting surface (S2) serves as a second deflecting member. The second reflecting surface (S2) deflects the illumination light in the same manner as in the first embodiment (FIGS. 1A to 1C). In addition, the illumination light entering the first deflecting mirror (MRA) and the illumination light exiting from the integrator rod (IR) are both substantially perpendicular to the rotation axis of the color wheel (CWT). This makes it possible to realize a slim projector as in the first embodiment.

The illumination light having entered the integrator rod (IR) through the incident end surface thereof is first reflected from the second reflecting surface (S2). The integrator rod (IR) is a solid body formed out of glass so as to have the shape of a polygonal prism or a hollow body formed by combining a plurality of mirrors together into a similar external shape. Thus, the illumination light having entered the integrator rod (IR) at various angles is, after being reflected from the second reflecting surface (S2), reflected repeatedly from the side surfaces of the integrator rod (IR), so that its spatial energy distribution (i.e. brightness distribution) is made uniform. Thereafter, the illumination light exits, as diffused light, from the integrator rod (IR) through the exiting end surface thereof located so as to be conjugate with the display surface of a display device (not shown), and then passes through the relay optical system (RL).

Figure 4A:
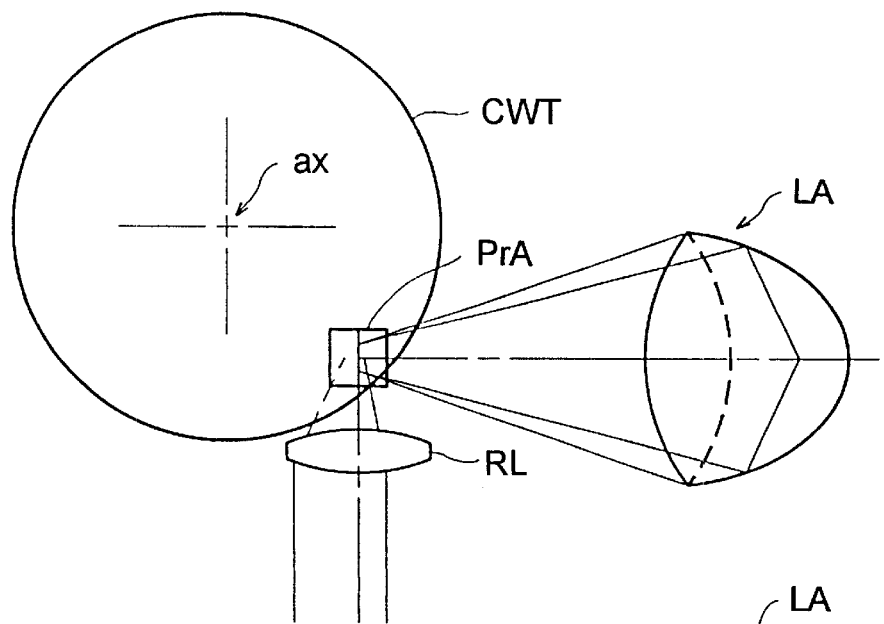
FIGS. 4A and 4B are optical construction diagrams showing the illumination system of a fourth embodiment of the invention.
Figure 4B:
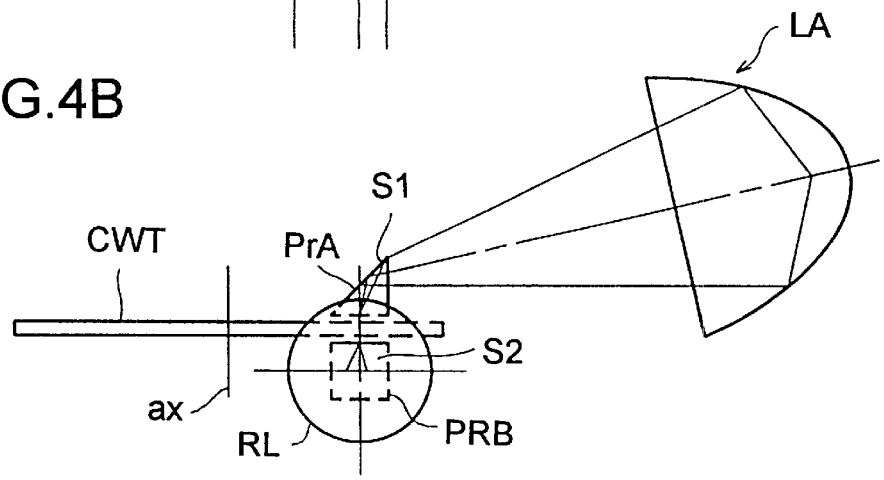

Fourth Embodiment (No. 4, FIGS. 4A and 4B)

FIGS. 4A and 4B show the illumination system of a fourth embodiment of the invention. FIG. 4A is a top view, and FIG. 4B is a front view. This illumination system for use in a projector has a lamp (LA) for emitting illumination light, a transmission-type color wheel (CWT), a first deflecting prism (PrA) for deflecting the illumination light before entering the color wheel (CWT), a second deflecting prism (PRB) for deflecting the illumination light after exiting from the color wheel (CWT), and a relay optical system (RL).

The distinctive feature of this embodiment is that the first deflecting prism (PrA) having a total-reflection surface (S1) serves as a first deflecting member. In other respects, the construction here is the same as in the second Embodiment (FIG. 2) described previously. The first deflecting prism (PrA) has a first reflecting surface (S1), and the illumination light before entering the color wheel (CWT) is deflected by being totally reflected from this first reflecting surface (S1). To fulfil the condition for total reflection, the incident angle with respect to the first reflecting surface (S1) is made slightly greater than in the second embodiment described earlier. However, as in the second embodiment, the illumination light entering the first deflecting prism (PrA) and the illumination light exiting from the second deflecting prism (PRB) are both substantially perpendicular to the rotation axis of the color wheel (CWT). This makes it possible to realize a slim projector as in the first Embodiment (FIGS. 1A to 1C).

Figure 5A:
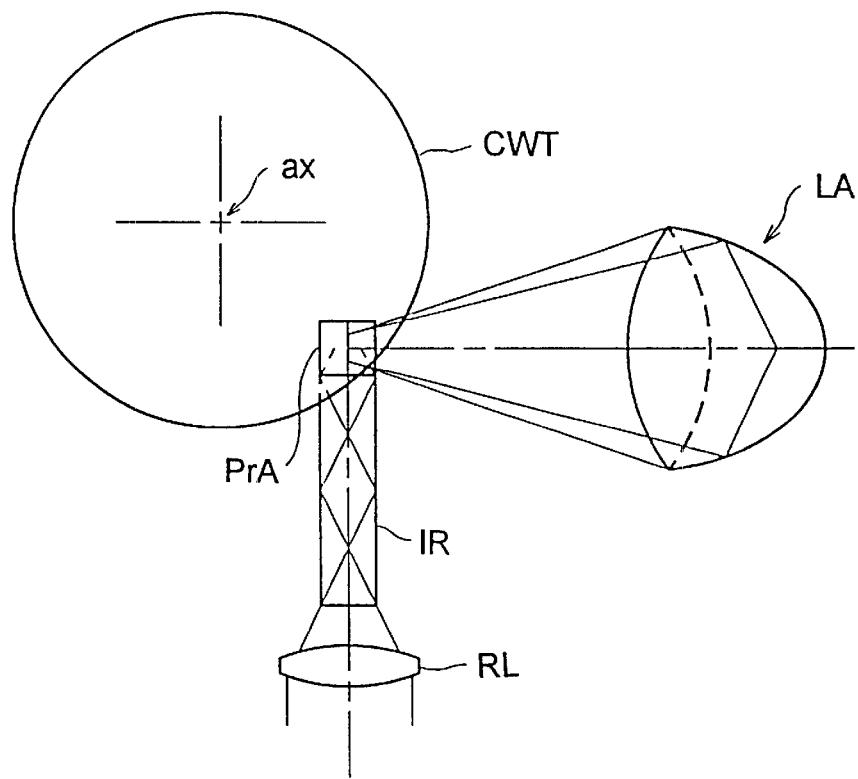
FIGS. 5A and 5B are optical construction diagrams showing the illumination system of a fifth embodiment of the invention.
Figure 5B:
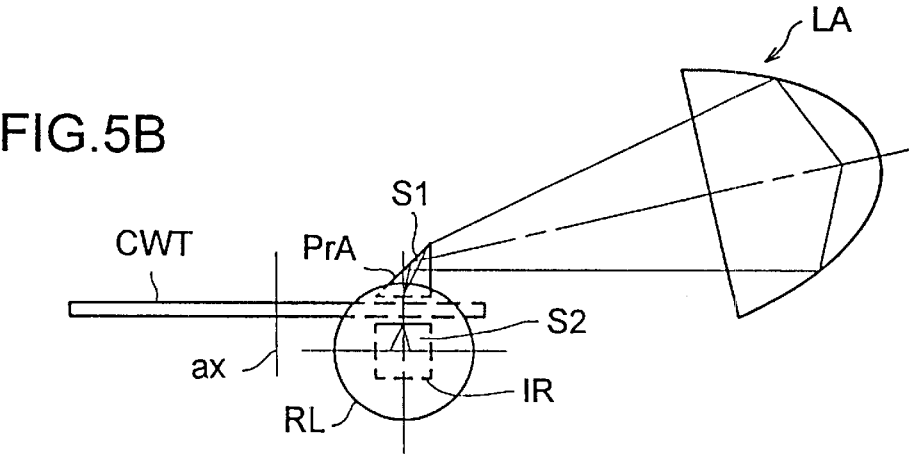

Fifth Embodiment (No. 5, FIGS. 5A and 5B)

FIGS. 5A and 5B show the illumination system of a fifth embodiment of the invention. FIG. 5A is a top view, and FIG. 5B is a front view. This illumination system for use in a projector has a lamp (LA) for emitting illumination light, a transmission-type color wheel (CWT), a first deflecting prism (PrA) for deflecting the illumination light before entering the color wheel (CWT), an integrator rod (IR) for deflecting the illumination light after exiting from the color wheel (CWT) and for making its spatial energy distribution uniform, and a relay optical system (RL). The distinctive feature of this embodiment is that, as in the third Embodiment (FIGS. 3A to 3C), the integrator rod (IR) having a second reflecting surface (S2) serves as a second deflecting member. In other respects, the construction here is the same as in the fourth Embodiment (FIGS. 4A and 4B) described earlier.

Figure 6A:
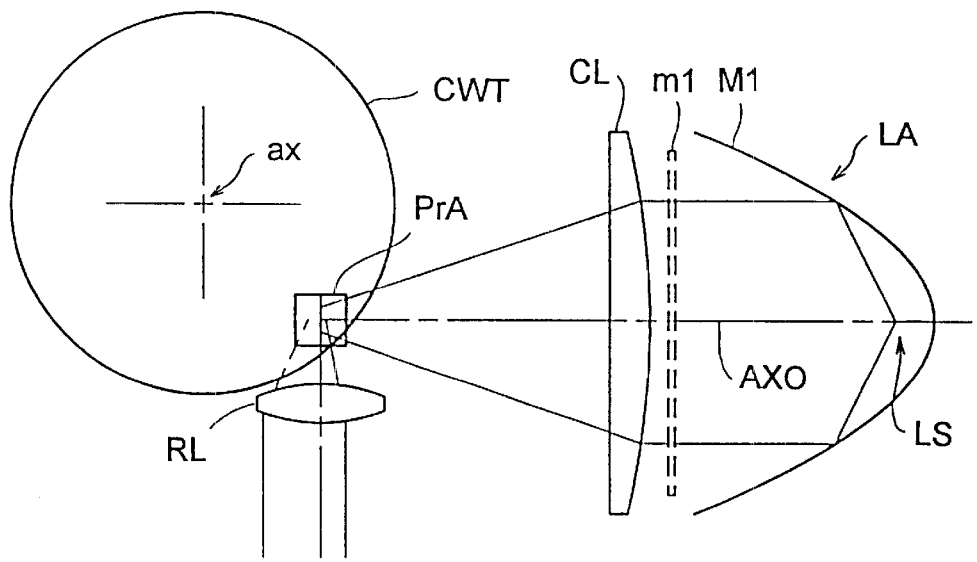
FIGS. 6A and 6B are optical construction diagrams showing the illumination system of a sixth embodiment of the invention.
Figure 6B:
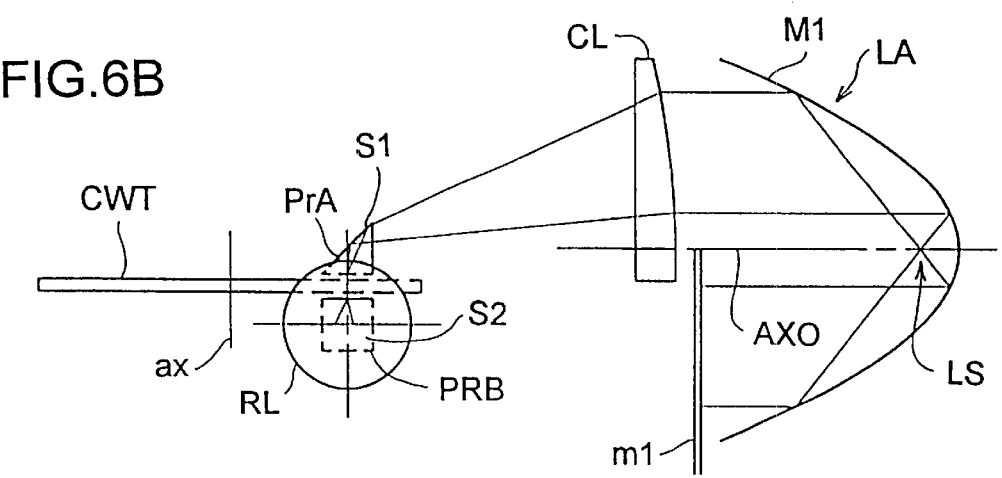

Sixth Embodiment (No. 6, FIGS. 6A and 6B)

FIGS. 6A and 6B show the illumination system of a sixth embodiment of the invention. FIG. 6A is a top view, and FIG. 6B is a front view. This illumination system for use in a projector has a lamp (LA), a condenser lens (CL) for condensing the illumination light emitted from the lamp (LA), a transmission-type color wheel (CWT), a first and a second deflecting prism (PrA, PRB) for deflecting the illumination light, and a relay optical system (RL). The distinctive feature of this embodiment is that the lamp (LA) has a reflector, which is composed of a paraboloid mirror (M1) that reflects, with its paraboloid surface, the illumination light emitted from the light source (LS) and a flat mirror (m1) that reflects the portion of the illumination light reflected from the paraboloid mirror (M1) back to the light source (LS).

The light source (LS) is located at the focal point of the paraboloid mirror (M1), and therefore the illumination light emitted from the light source (LS) is made substantially parallel to the optical axis of the lamp (AX0) by being reflected from the paraboloid mirror (M1). The lower half of the aperture of the paraboloid mirror (M1), i.e. the portion of the aperture that lies behind the color wheel (CWT), is covered with the flat mirror (m1) having a reflecting surface perpendicular to the optical axis of the lamp (AX0). Therefore, the illumination light reflected from the lower half of the paraboloid mirror (M1) is then reflected from the flat mirror (m1), and then travels back to the light source (LS), tracing backward the same optical path it has thus far followed. This illumination light then, together with the illumination light reflected from the upper half of the paraboloid mirror (M1), exits therefrom through the upper half of the aperture. The illumination light having exited from the paraboloid mirror (M1) passes through the D-shaped condenser lens (CL), and then enters the first deflecting prism (PrA). After entering the first deflecting prism (PrA), the illumination light is optically acted upon in the same manner as in the fourth Embodiment (FIGS. 4A and 4B), and eventually exits from the relay optical system (RL). Here, the condenser lens (CL) is D-shaped because it does not need to cover the lower half of the aperture that is covered with the flat mirror (m1); however, it may be a common, circular lens.

By the use of the above-described reflector composed of the paraboloid mirror (M1) and the flat mirror (m1), even when the optical axis of the lamp (AX0) is parallel to the transmissive surface of the color wheel (CWT), i.e. perpendicular to the rotation axis (ax), it is possible to fulfil the condition for total reflection on the first reflecting surface (S1). Thus, as shown in FIGS. 6A and 6B, it is possible to make both the illumination light entering the first deflecting prism (PrA) and the illumination light exiting from the second deflecting prism (PRB) substantially perpendicular to the rotation axis (ax) of the color wheel (CWT). As long as this perpendicular relationship is fulfilled between the color wheel (CWT) and the optical path of the illumination light, the color wheel (CWT) can be arranged horizontally without jutting upward or downward. With the color wheel (CWT) arranged horizontally, it is possible to realize a slimmer illumination system without making the diameter of the color wheel (CWT) smaller. In this way, as described earlier, it is possible to realize a slim and compact projector and obtain projected images without degradation in brightness or color purity.

Figure 7A:
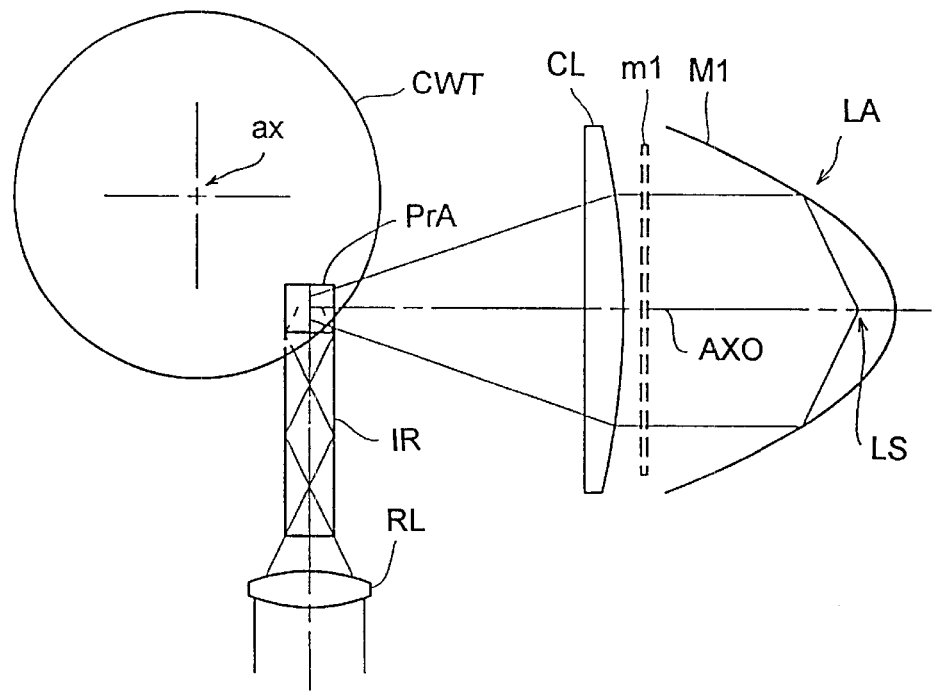
FIGS. 7A and 7B are optical construction diagrams showing the illumination system of a seventh embodiment of the invention.
Figure 7B:
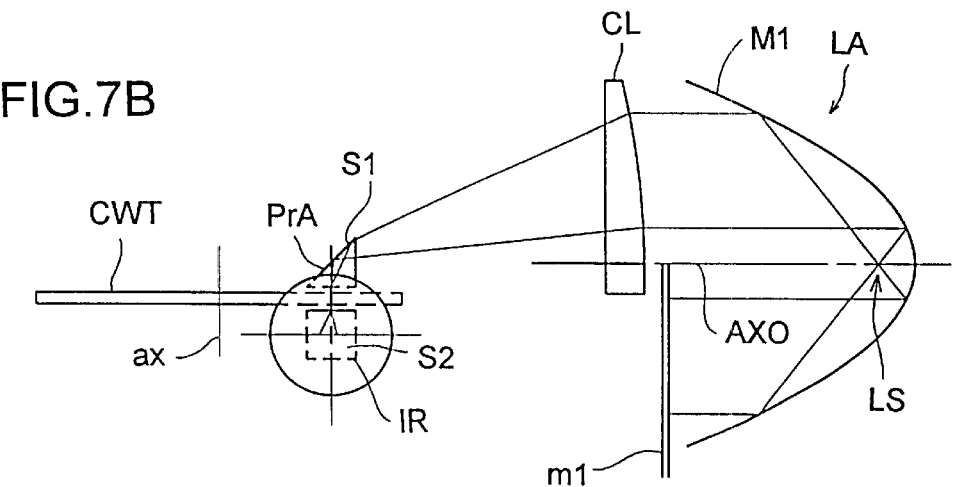

Seventh Embodiment (No. 7, FIGS. 7A and 7B)

FIGS. 7A and 7B show the illumination system of a seventh embodiment of the invention. FIG. 7A is a top view, and FIG. 7B is a front view. This illumination system for use in a projector has a lamp (LA) having a reflector composed of a paraboloid mirror (M1) and a flat mirror (m1), a condenser lens (CL) for condensing the illumination light emitted from the lamp (LA), a transmission-type color wheel (CWT), a first deflecting prism (PrA) for deflecting the illumination light before entering the color wheel (CWT), and an integrator rod (IR) for deflecting the illumination light after exiting from the color wheel (CWT) and for making its spatial energy distribution uniform, and a relay optical system (RL). The distinctive feature of this embodiment is that, as in the third Embodiment (FIGS. 3A to 3C), the integrator rod (IR) having a second reflecting surface (S2) serves as a second deflecting member. In other respects, the construction here is the same as in the sixth Embodiment (FIGS. 6A and 6B) described previously.

Figure 8A:
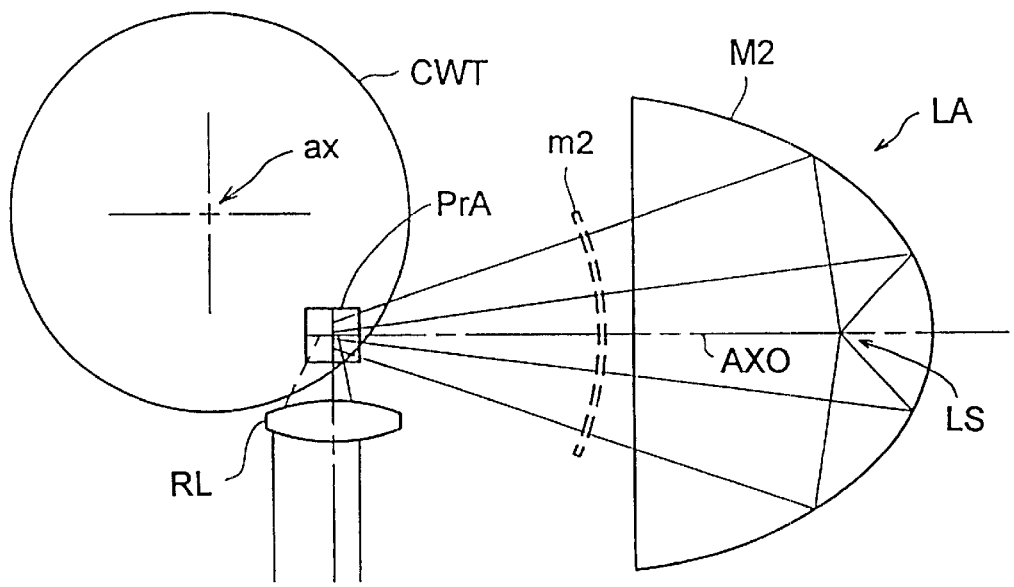
FIGS. 8A and 8B are optical construction diagrams showing the illumination system of an eighth embodiment of the invention.
Figure 8B:
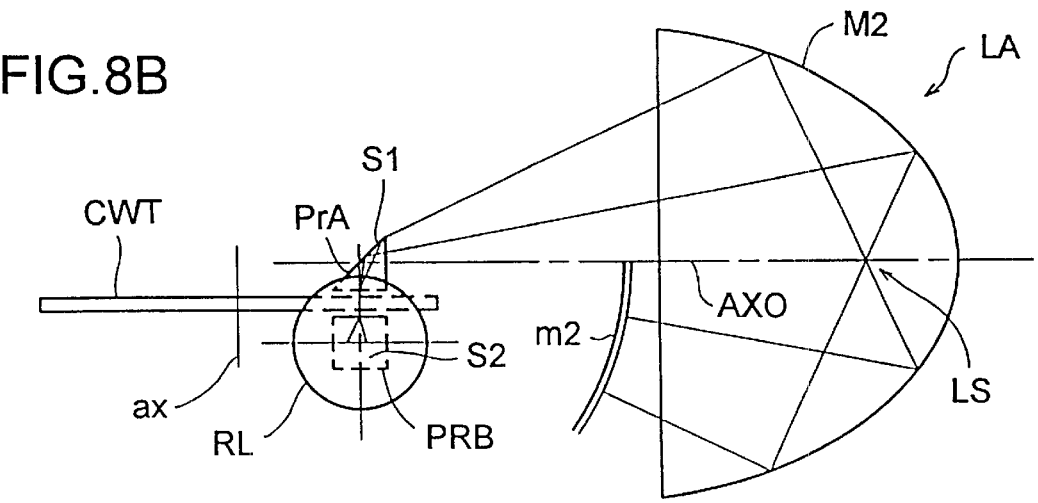

Eighth Embodiment (No. 8, FIGS. 8A and 8B)

FIGS. 8A and 8B show the illumination system of an eighth embodiment of the invention. FIG. 8A is a top view, and FIG. 8B is a front view. This illumination system for use in a projector has a lamp (LA) for emitting illumination light, a transmission-type color wheel (CWT), a first and a second deflecting prism (PrA, PRB) for deflecting the illumination light, and a relay optical system (RL). The distinctive feature of this embodiment is that the lamp (LA) has a reflector, which is composed of an ellipsoid mirror (M2) that reflects, with its ellipsoid surface, the illumination light emitted from the light source (LS) and a spherical mirror (m2) that reflects the portion of the illumination light reflected from the ellipsoid mirror (M2) back to the light source (LS).

The light source (LS) is located at the first focal point of the ellipsoid mirror (M2), and therefore the illumination light emitted from the light source (LS) is focused at the second focal point by being reflected from the elliptic mirror (M2). The spherical mirror (m2) has a convex reflecting surface so shaped as to describe a part of a spherical surface having its center at the second focal point of the ellipsoid mirror (M2). Substantially the lower half of the aperture of the ellipsoid mirror (M2), i.e. the portion of the aperture that lies behind the color wheel (CWT), is covered with the spherical mirror (m2). Thus, the illumination light reflected from the lower half of the ellipsoid mirror (M2) is then reflected from the spherical mirror (m2), and then travels back to the light source (LS), tracing backward the same optical path it has thus far followed. This illumination light then, together with the illumination light reflected from the upper half of the ellipsoid mirror (M2), exits therefrom through the upper half of the aperture. The illumination light having exited from the ellipsoid mirror (M2) enters the first deflecting prism (PrA). After entering the first deflecting prism (PrA), the illumination light is optically acted upon in the same manner as in the fourth Embodiment (FIGS. 4A and 4B), and eventually exits from the relay optical system (RL).

By the use of the above-described reflector composed of the ellipsoid mirror (M2) and the spherical mirror (m2), even when the optical axis of the lamp (AX0) is parallel to the transmissive surface of the color wheel (CWT), i.e. perpendicular to the rotation axis (ax), it is possible to fulfil the condition for total reflection on the first reflecting surface (S1). Thus, as shown in FIGS. 8A and 8B, it is possible to make both the illumination light entering the first deflecting prism (PrA) and the illumination light exiting from the second deflecting prism (PRB) substantially perpendicular to the rotation axis (ax) of the color wheel (CWT). As long as this perpendicular relationship is fulfilled between the color wheel (CWT) and the optical path of the illumination light, the color wheel (CWT) can be arranged horizontally without jutting upward or downward. With the color wheel (CWT) arranged horizontally, it is possible to realize a slimmer illumination system without making the diameter of the color wheel (CWT) smaller. In this way, as described earlier, it is possible to realize a slim and compact projector and obtain projected images without degradation in brightness or color purity.

Figure 9A:
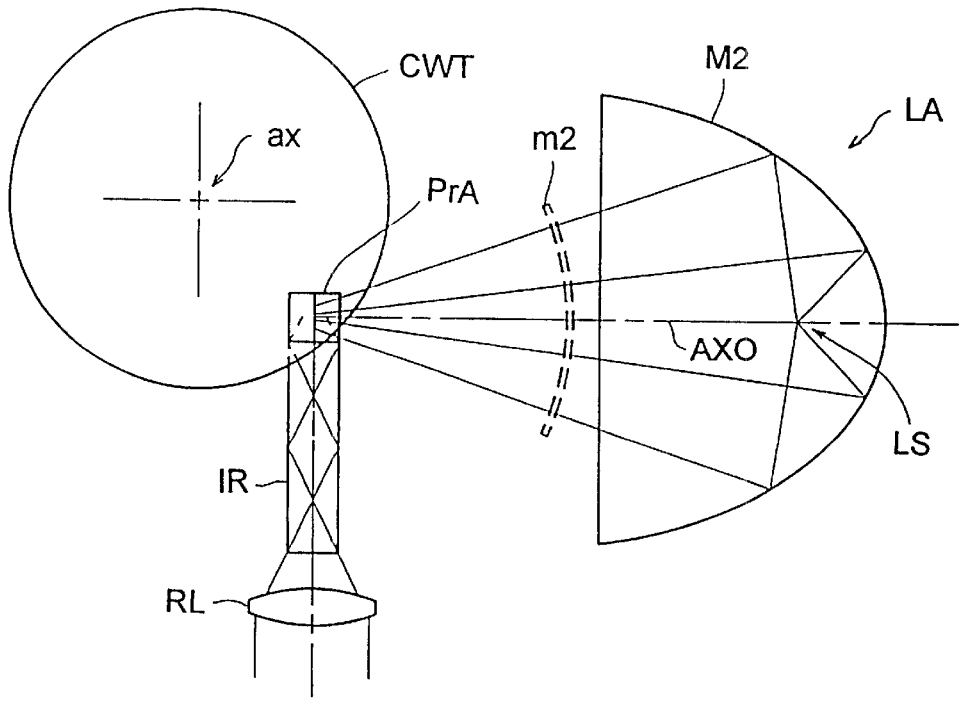
FIGS. 9A and 9B are optical construction diagrams showing the illumination system of a ninth embodiment of the invention.
Figure 9B:
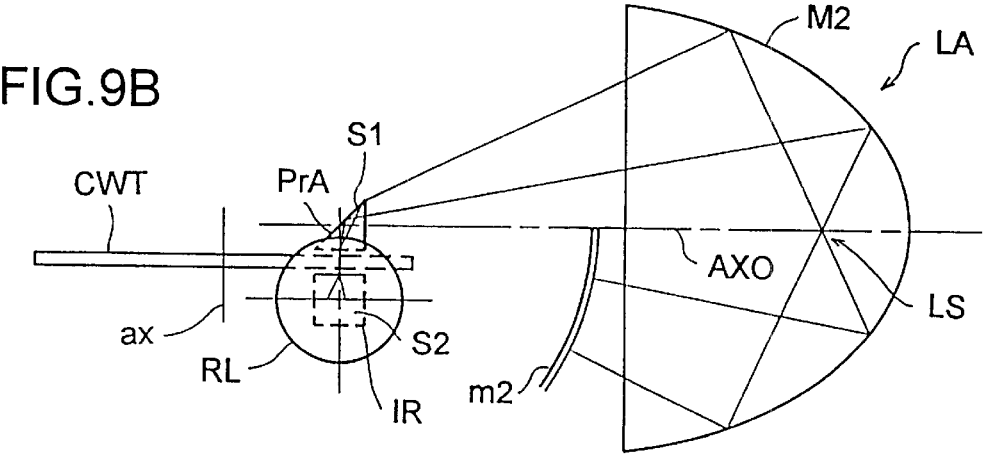

Ninth Embodiment (No. 9, FIGS. 9A and 9B)

FIGS. 9A and 9B show the illumination system of a ninth embodiment of the invention. FIG. 9A is a top view, and FIG. 9B is a front view. This illumination system for use in a projector has a lamp (LA) having a reflector composed of an ellipsoid mirror (M2) and a spherical mirror (m2), a transmission-type color wheel (CWT), a first deflecting prism (PrA) for deflecting the illumination light before entering the color wheel (CWT), an integrator rod (IR) for deflecting the illumination light after exiting from the color wheel (CWT) and for making its spatial distribution energy uniform, and a relay optical system (RL). The distinctive feature of this embodiment is that, as in the third Embodiment (FIGS. 3A to 3C), the integrator rod (IR) having a second reflecting surface (S2) serves as a second deflecting member. In other respects, the construction here is the same as in the eighth Embodiment (FIGS. 8A and 8B).

Figure 10A:
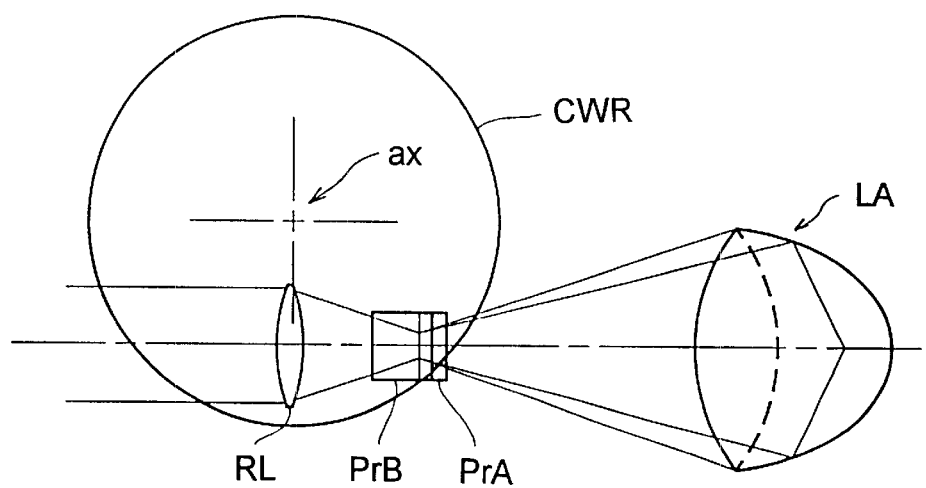
FIGS. 10A and 10B are optical construction diagrams showing the illumination system of a tenth embodiment of the invention.
Figure 10B:
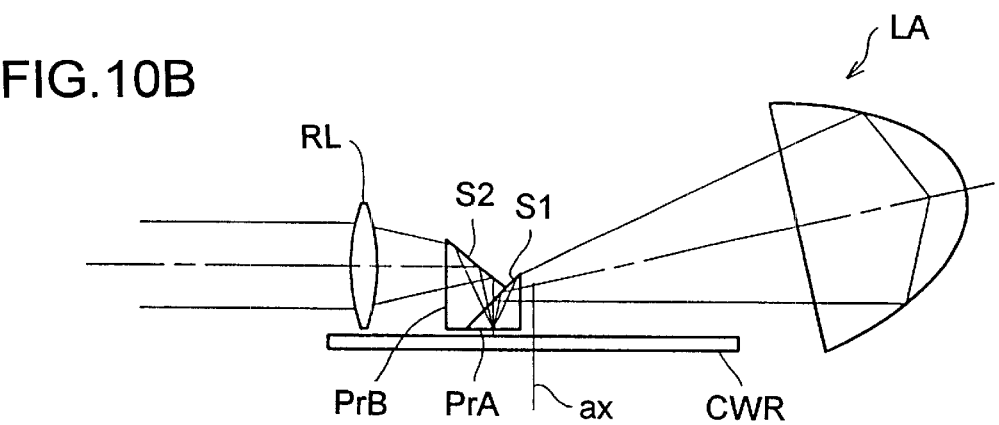

Tenth Embodiment (No. 10, FIGS. 10A and 10B)

FIGS. 10A and 10B show a tenth embodiment of the invention. FIG. 10A is a top view, and FIG. 10B is a front view. This illumination system for use in a projector has a lamp (LA) for emitting illumination light, a reflection-type color wheel (CWR) for reflecting the illumination light in such a way that light of colors sequentially switched with time is reflected therefrom, a first deflecting prism (PrA) for deflecting the illumination light before entering the color wheel (CWR), a second deflecting prism (PrB) for deflecting the illumination light after exiting from the color wheel (CWR), and a relay optical system (RL).

The first deflecting prism (PrA) serving as a first deflecting member has a first reflecting surface (S1), and the illumination light before entering the color wheel (CWR) is deflected by being reflected from this first reflecting surface (S1). On the other hand, the second deflecting prism (PrB) serving as a second deflecting member has a second reflecting surface (S2), and the illumination light after being reflected from the color wheel is deflected by being reflected from this second reflecting surface (S2). The first reflecting surface (S1) is formed as a total-reflection surface which totally reflects the illumination light, and those surfaces of the first and second deflecting prisms (PrA, PrB) that face each other are arranged substantially parallel to each other with a predetermined air gap secured in between. That is, the first deflective prism (PrA) and the second deflective prism (PrB) form a so-called TIR prism.

The illumination light emitted from the lamp (LA) first enters the first deflecting prism (PrA). This first deflecting prism (PrA) is formed as a perpendicular prism fulfilling the condition for total reflection on the first reflecting surface (S1), and the illumination light having entered the first deflecting prism (PrA) is totally reflected from the first reflecting surface (S1). The illumination light totally reflected from the first reflecting surface (S1) exits from the first deflecting prism (PrA) so as to be reflected from the color wheel (CWR). The color wheel is composed of a plurality of color filters transmitting light of different colors (such as R, G, and B), and is so constructed as to rotate, by the action of a motor or the like, about a rotation axis (ax) in such a way that a display device (not shown) is illuminated with light of colors sequentially switched with time. The illumination light reflected from the color wheel (CWR) reenters the first deflecting prism (PrA) and is transmitted through the first reflecting surface (S1). Then, the illumination light is transmitted through the surface facing the first reflecting surface (S1), and enters the second deflecting prism (PrB). The illumination light having entered the second deflecting prism (PrB) is reflected from the second reflecting surface (S2), then exits from the second deflecting prism (PrB), and eventually passes through the relay optical system (RL). This second reflecting surface (S2) is formed as a mirror-coated surface having a metal vapor-deposited thereon; however, a total-reflection surface may be used instead.

Also in the tenth embodiment, where the color wheel (CWR) is of a reflection type, the illumination light entering the first deflecting prism (PrA) and the illumination light exiting from the second deflecting prism (PrB) are both substantially perpendicular to the rotation axis (ax) of the color wheel (CWR). As long as this perpendicular relationship is fulfilled between the color wheel (CWR) and the optical path of the illumination light, the color wheel (CWR) can be arranged horizontally without jutting upward or downward. With the color wheel (CWR) arranged horizontally, it is possible to realize a slimmer illumination system without making the diameter of the color wheel (CWR) smaller. Thus, employing this illumination system makes it possible to realize slim and compact mobile projectors for which there is a keen demand on the market. In addition, since there is no need to make the diameter of the color wheel (CWR) smaller in making projectors slimmer (i.e. smaller in height), it is possible to obtain projected images without degradation in brightness or color purity.

In an illumination system for use in a projector, when a reflection-type color wheel (CWR) is used as a color separation system, it is necessary to separate the light incident on the color wheel (CWR) and the light reflected therefrom. In the tenth embodiment, by the use of the first deflecting prism (PrA) having the total-reflection surface (S1), light separation is achieved on the basis of difference in angles. Where a deflecting member having a total-reflection surface is used to separate the light incident on the reflection-type color wheel (CWR) and the light reflected therefrom, light separation is achieved through angle selection. As a result, even if the light beam angle and the light source image of the light incident on the color wheel (CWR) is large, it is possible to efficiently separate the incident and reflected light. That is, even if the light source image is large, there is no loss of light rays caused by an overlap between the incident and reflected light. Moreover, there is no need to make the light beam angle smaller, and therefore no degradation results in light transmission efficiency or the like. Thus, by employing this illumination system in a projector, it is possible to obtain bright projected images.

When at least one of the first and second reflecting surfaces (S1, S2) is a total-reflection surface that totally reflects the illumination light, it is possible to achieve highly efficient light separation as described earlier. Thus, the second reflecting surface (S2) may be a total-reflection surface. Alternatively, since a deflecting surface that is not a total-reflection surface does not necessarily have to be a reflecting surface, an optical surface that extents a light-deflecting action such as a refractive surface or a diffractive surface may be used in place of the second reflecting surface (S2). This yields the same effect.

Figure 11A:
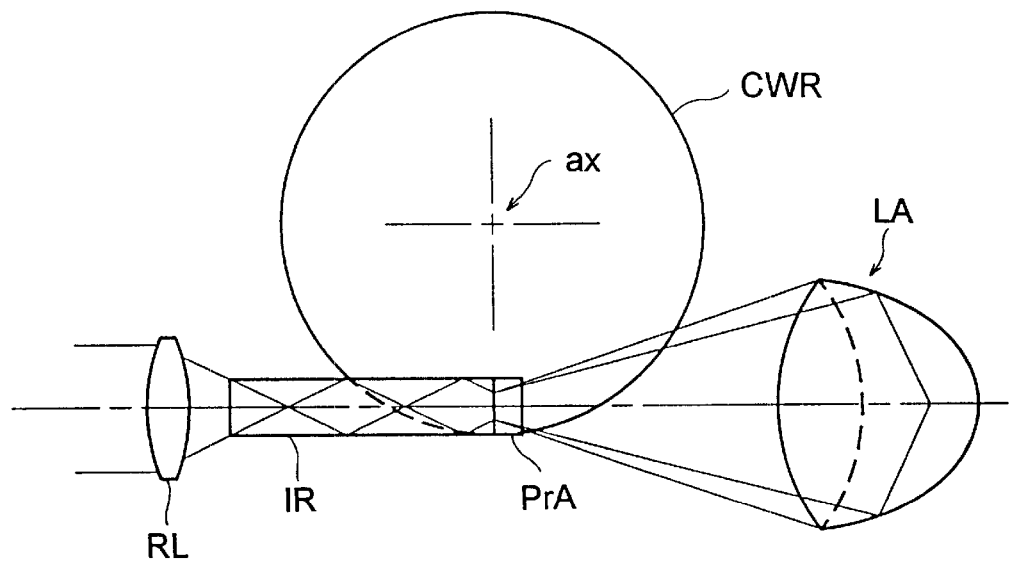
FIGS. 11A and 11B are optical construction diagrams showing the illumination system of an eleventh embodiment of the invention.
Figure 11B:
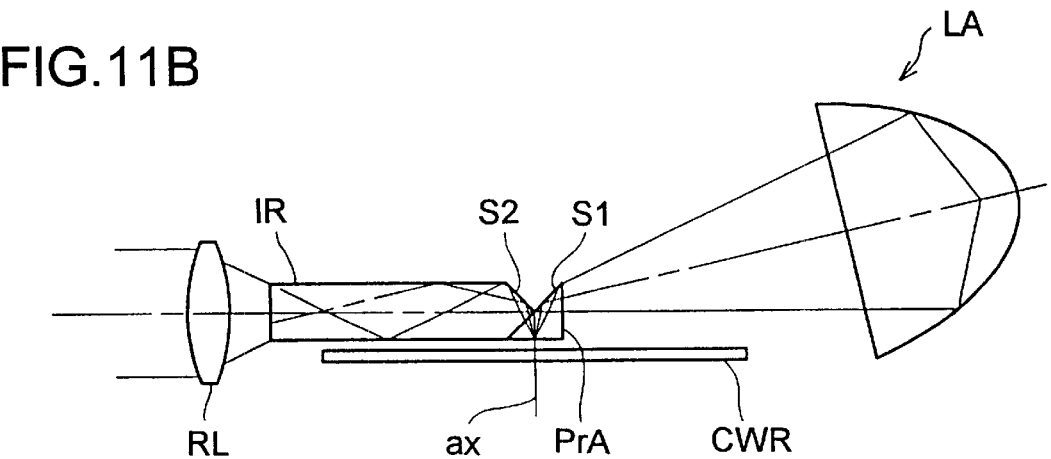

Eleventh Embodiment (No. 11, FIGS. 11A and 11B)

FIGS. 11A and 11B show the illumination system of an eleventh embodiment of the invention. FIG. 11A is a top view, and FIG. 11B is a front view. This illumination system for use in a projector has a lamp (LA) for emitting illumination light, a reflection-type color wheel (CWR), a first deflecting prism (PrA) for deflecting the illumination light before entering the color wheel (CWR), an integrator rod (IR) for deflecting the illumination light after exiting from the color wheel (CWR) and for making its spatial distribution energy uniform, and a relay optical system (RL). The distinctive feature of this embodiment is that the integrator rod (IR) having a second reflecting surface (S2) serves as a second deflecting member. The second reflecting surface (S2) deflects the illumination light in the same manners as in the tenth Embodiment (FIG. 10). The illumination light entering the first deflecting prism (PrA) and the illumination light exiting from the integrator rod (IR) are both substantially perpendicular to the rotation axis (ax) of the color wheel (CWR). Thus, it is possible to realize a slim illumination system and thus a slim projector as in the tenth embodiment.

The incident end surface of the integrator rod (IR) faces and is arranged substantially parallel to the first reflecting surface (S1) of the first deflecting prism (PrA) with a predetermined air gap secured in between. The illumination light having entered the integrator rod (IR) through the incident end surface thereof is first reflected from the second reflecting surface (S2). The integrator rod (IR) is a solid body formed out of glass so as to have the shape of a polygonal prism or a hollow body formed by combining a plurality of mirrors together into a similar external shape. Thus, the illumination light having entered the integrator rod (IR) at various angles is, after being reflected from the second reflecting surface (S2), reflected repeatedly from the side surfaces of the integrator rod (IR), so that its spatial energy distribution (i.e. brightness distribution) is made uniform. Thereafter, the illumination light exits, as diffused light, from the integrator rod (IR) through the exiting end surface thereof located so as to be conjugate with the display surface of a display device (not shown), and then passes through the relay illumination light reflected from the upper half of the paraboloid mirror (M1), exits therefrom through the upper half of the aperture. The illumination light having exited from the paraboloid mirror (M1) passes through the D-shaped condenser lens (CL), and then enters the first deflecting prism (PrA). After entering the first deflecting prism (PrA), the illumination light is optically acted upon in the same manner as in the tenth Embodiment (FIGS. 10A and 10B), and eventually exits from the relay optical system (RL). Here, the condenser lens (CL) is D-shaped because it does not need to cover the lower half of the aperture that is covered with the flat mirror (m1); however, it may be a common, circular lens.

Figure 12A:
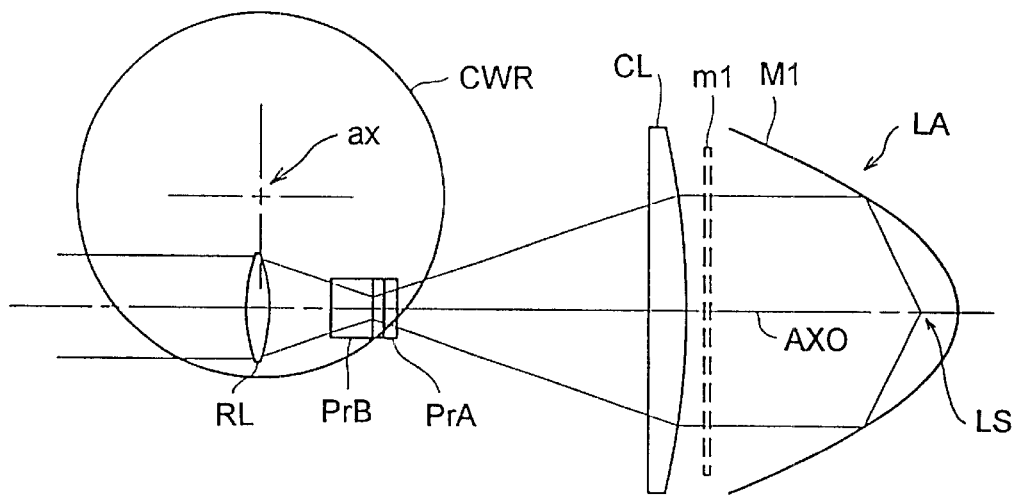
FIGS. 12A and 12B are optical construction diagrams showing the illumination system of a twelfth embodiment of the invention.
Figure 12B:
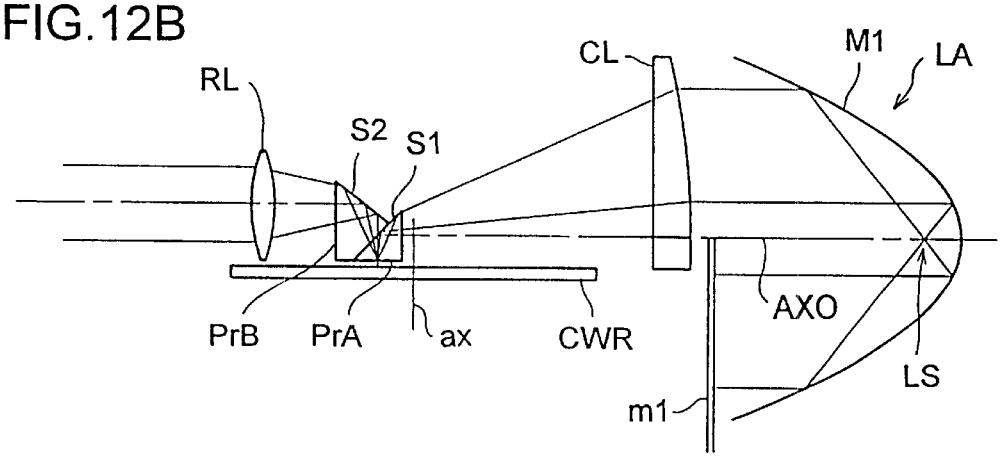

By the use of the above-described reflector composed of the paraboloid mirror (M1) and the flat mirror (m1), even when the optical axis of the lamp (AX0) is parallel to the transmissive surface of the color wheel (CWR), i.e. perpendicular to the rotation axis (ax), it is possible to fulfil the condition for total reflection on the first reflecting surface (S1). Thus, as shown in FIGS. 12A and 12B, it is possible to make both the illumination light entering the first deflecting prism (PrA) and the illumination light exiting from the second deflecting prism (PRB) substantially perpendicular to the rotation axis (ax) of the color wheel (CWR). As long as this perpendicular relationship is fulfilled between the color wheel (CWR) and the optical path of the illumination light, the color wheel (CWR) can be arranged horizontally without jutting upward or downward. With the color wheel (CWR) arranged horizontally, it is possible to realize a slimmer illumination system without making the diameter of the color wheel (CWR) smaller. In this way, as described earlier, it is possible to realize a slim and compact projector and obtain projected images without degradation in brightness or color purity. optical system (RL).

Twelfth Embodiment (No. 12, FIGS. 12A and 12B)

FIGS. 12A and 12B show the illumination system of a twelfth embodiment of the invention. FIG. 12A is a top view, and FIG. 12B is a front view. This illumination system for use in a projector has a lamp (LA) for emitting illumination light, a condenser lens (CL) for condensing the illumination light emitted from the lamp (LA), a reflection-type color wheel (CWR), a first and a second deflecting prism (PrA, PRB) for deflecting the illumination light, and a relay optical system (RL). The distinctive feature of this embodiment is that the lamp (LA) has a reflector, which is composed of a paraboloid mirror (M1) that reflects, with its paraboloid surface, the illumination light emitted from the light source (LS) and a flat mirror (m1) that reflects the portion of the illumination light reflected from the paraboloid mirror (M1) back to the light source (LS).

The light source (LS) is located at the focal point of the paraboloid mirror (M1), and therefore the illumination light emitted from the light source (LS) is made substantially parallel to the optical axis of the lamp (AX0) by being reflected from the paraboloid mirror (M1). The lower half of the aperture of the paraboloid mirror (M1), i.e. the portion of the aperture that lies behind the color wheel (CWR), is covered with the flat mirror (m1) having a reflecting surface perpendicular to the optical axis of the lamp (AX0). Therefore, the illumination light reflected from the lower half of the paraboloid mirror (M1) is then reflected from the flat mirror (m1), and then travels back to the light source (LS), tracing backward the same optical path it has thus far followed. This illumination light then, together with the Thirteenth Embodiment (No. 13, FIGS. 13A and 13B)

FIGS. 13A and 13B show the illumination system of a thirteenth embodiment of the invention. FIG. 13A is a top view, and FIG. 13B is a front view. This illumination system for use in a projector has a lamp (LA) having a reflector composed of a paraboloid mirror (M1) and a flat mirror (m1), a condenser lens (CL) for condensing the illumination light after exiting from the lamp (LA), a reflection-type color wheel (CWR), a first deflecting prism (PrA) for deflecting the illumination light before entering the color wheel (CWR), and an integrator rod (IR) for deflecting the illumination light after exiting from the color wheel (CWR) and for making its spatial distribution energy uniform, and a relay optical system (RL). The distinctive feature of this embodiment is that, as in the eleventh embodiment (FIGS. 11A and 11B), the integrator rod (IR) having a second reflecting surface (S2) serves as a second deflecting member. In other respects, the construction here is the same as in the twelfth Embodiment (FIGS. 12A and 12B).

Figure 14A:
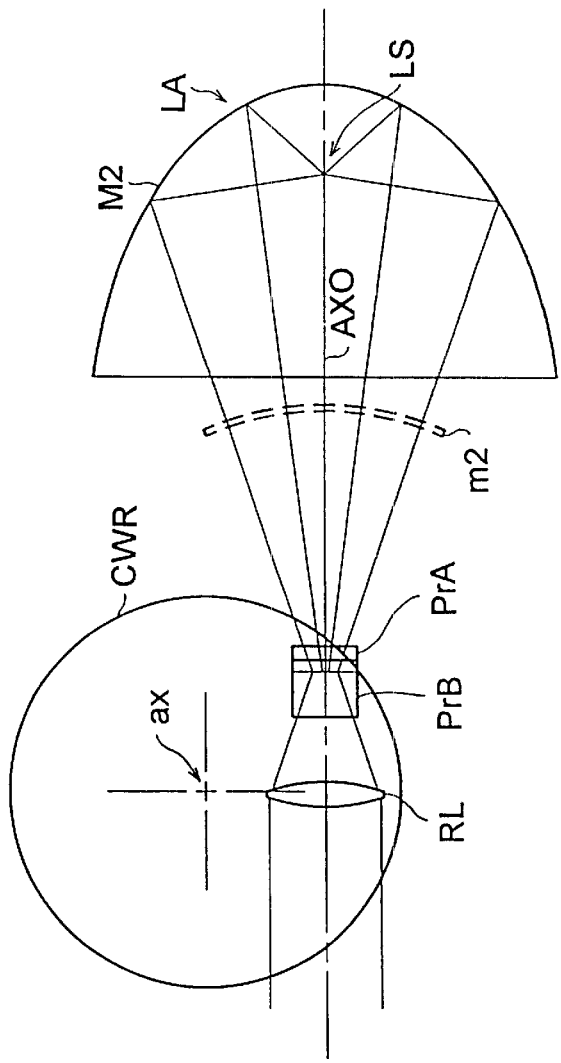
FIGS. 14A and 14B are optical construction diagrams showing the illumination system of a fourteenth embodiment of the invention.
Figure 14B:
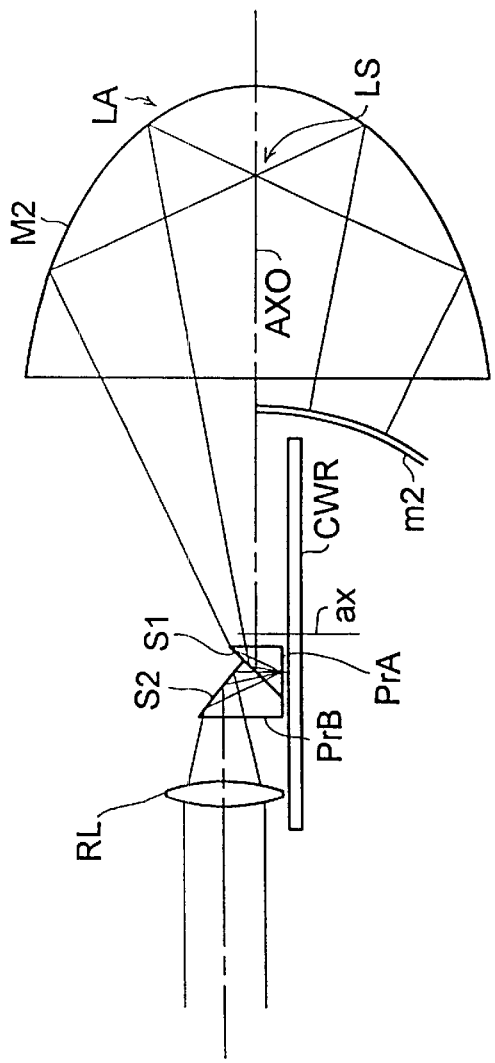

Fourteenth Embodiment (No. 14, FIGS. 14A and 14B)

FIGS. 14A and 14B show the illumination system of a fourteenth embodiment of the invention. FIG. 14A is a top view, and FIG. 14B is a front view. This illumination system for use in a projector has a lamp (LA) for emitting illumination light, a reflection-type color wheel (CWR), a first and a second deflecting prism (PrA, PrB) for deflecting the illumination light, and a relay optical system (RL). The distinctive feature of this embodiment is that the lamp (LA) has a reflector, which is composed of an ellipsoid mirror (M2) that reflects, with its ellipsoid surface, the illumination light emitted from the light source (LS) and a spherical mirror (m2) that reflects the portion of the illumination light reflected from the ellipsoid mirror (M2) back to the light source (LS).

The light source (LS) is located at the first focal point of the ellipsoid mirror (M2), and therefore the illumination light emitted from the light source (LS) is focused at the second focal point by being reflected from the elliptic mirror (M2). The spherical mirror (m2) has a convex reflecting surface so shaped as to describe a part of a spherical surface having its center at the second focal point of the ellipsoid mirror (M2). Substantially the lower half of the aperture of the ellipsoid mirror (M2), i.e. the portion of the aperture that lies behind the color wheel (CWR), is covered with the spherical mirror (m2). Thus, the illumination light reflected from the lower half of the ellipsoid mirror (M2) is then reflected from the spherical mirror (m2), and then travels back to the light source (LS), tracing backward the same optical path it has thus far followed. This illumination light then, together with the illumination light reflected from the upper half of the ellipsoid mirror (M2), exits therefrom through the upper half of the aperture. The illumination light having exited from the ellipsoid mirror (M2) enters the first deflecting prism (PrA). After entering the first deflecting prism (PrA), the illumination light is optically acted upon in the same manner as in the tenth Embodiment (FIGS. 10A and 10B), and eventually exits from the relay optical system (RL).

By the use of the above-described reflector composed of the ellipsoid mirror (M2) and the spherical mirror (m2), even when the optical axis of the lamp (AX0) is parallel to the transmissive surface of the color wheel (CWR), i.e. perpendicular to the rotation axis (ax), it is possible to fulfil the condition for total reflection on the first reflecting surface (S1). Thus, as shown in FIGS. 14A and 14B, it is possible to make both the illumination light entering the first deflecting prism (PrA) and the illumination light exiting from the second deflecting prism (PRB) substantially perpendicular to the rotation axis (ax) of the color wheel (CWR). As long as this perpendicular relationship is fulfilled between the color wheel (CWR) and the optical path of the illumination light, the color wheel (CWR) can be arranged horizontally without jutting upward or downward. With the color wheel (CWR) arranged horizontally, it is possible to realize a slimmer illumination system without making the diameter of the color wheel (CWR) smaller. In this way, as described earlier, it is possible to realize a slim and compact projector and obtain projected images without degradation in brightness or color purity.

Fifteenth Embodiment (No. 15, FIGS. 15A and 15B)

FIGS. 15A and 15B show the illumination system of a fifteenth embodiment of the invention. FIG. 15A is a top view, and FIG. 15B is a front view. This illumination system for use in a projector has a lamp (LA) having a reflector composed of an ellipsoid mirror (M2) and a spherical mirror (m2), a reflection-type color wheel (CWR), a first deflecting prism (PrA) for deflecting the illumination light before entering the color wheel (CWR), an integrator rod (IR) for deflecting the illumination light after exiting from the color wheel (CWR) and for making its spatial distribution energy uniform, and a relay optical system (RL). The distinctive feature of this embodiment is that, as in the eleventh Embodiment (FIGS. 11A and 11B), the integrator rod (IR) having a second reflecting surface (S2) serves as a second deflecting member. In other respects, the construction here is the same as in the fourteenth Embodiment (FIGS. 14A and 14B).

Distinctive Features of the Illumination Systems of the Embodiments (FIGS. 1 to 15)

Table 1 shows a summary of the distinctive features of the individual embodiments described heretofore. The numbers in the table (No. 1~15) correspond to the first to fifteenth embodiments, respectively.

TABLE 1

Distinctive Features of the first to fifteenth embodiments (No. 1 to 15)

| No. | Color Wheel | First Deflecting Member (First Reflecting Surface) | Second Deflecting Member (Second Reflecting Surface) | Reflector |
|---|---|---|---|---|
| 1 | Transmission-type | Flat Mirror (Mirror Surface) | Flat Mirror (Mirror Surface) | Ellipsoid Mirror |
| 2 | Transmission-type | Prism (Mirror-Coated Surface) | Prism (Mirror-Coated Surface) | Ellipsoid Mirror |
| 3 | Transmission-type | Flat Mirror (Mirror Surface) | Integrator Rod (Mirror-Coated Surface or Total-Reflection Surface) | Ellipsoid Mirror |

TABLE 1-continued

Distinctive Features of the first to fifteenth embodiments (No. 1 to 15)

| No. | Color Wheel | First Deflecting Member (First Reflecting Surface) | Second Deflecting Member (Second Reflecting Surface) | Reflector |
|---|---|---|---|---|
| 4 | Transmission-type | Prism (Total-Reflection Surface) | Prism (Mirror-Coated Surface) | Ellipsoid Mirror |
| 5 | Transmission-type | Prism (Total-Reflection Surface) | Integrator Rod (Mirror-Coated Surface or Total-Reflection Surface) | Ellipsoid Mirror |
| 6 | Transmission-type | Prism (Total-Reflection Surface) | Prism (Mirror-Coated Surface) | Ellipsoid Mirror + Plane Mirror |
| 7 | Transmission-type | Prism (Total-Reflection Surface) | Integrator Rod (Mirror-Coated Surface or Total-Reflection Surface) | Ellipsoid Mirror + Plane Mirror |
| 8 | Transmission-type | Prism (Total-Reflection Surface) | Prism (Mirror-Coated Surface or Total-Reflection Surface) | Ellipsoid Mirror + Plane Mirror |
| 9 | Transmission-type | Prism (Total-Reflection Surface) | Integrator Rod (Mirror-Coated Surface or Total-Reflection Surface) | Ellipsoid Mirror + Spherical Mirror |
| 10 | Reflection-type | Prism (Total-Reflection Surface) | Prism (Mirror-Coated Surface or Total-Reflection Surface) | Ellipsoid Mirror |
| 11 | Reflection-type | Prism (Total-Reflection Surface) | Integrator Rod (Mirror-Coated Surface or Total-Reflection Surface) | Ellipsoid Mirror |
| 12 | Reflection-type | Prism (Total-Reflection Surface) | Prism (Mirror-Coated Surface or Total-Reflection Surface) | Paraboloid Mirror + Plane Mirror |
| 13 | Reflection-type | Prism (Total-Reflection Surface) | Integrator Rod (Mirror-Coated Surface or Total-Reflection Surface) | Paraboloid Mirror + Plane Mirror |
| 14 | Reflection-type | Prism (Total-Reflection Surface) | Prism (Mirror-Coated Surface or Total-Reflection Surface) | Ellipsoid Mirror + Spherical Mirror |
| 15 | Reflection-type | Prism (Total-Reflection Surface) | Integrator Rod (Mirror-Coated Surface or Total-Reflection Surface) | Ellipsoid Mirror + Spherical Mirror |

Figure 16:
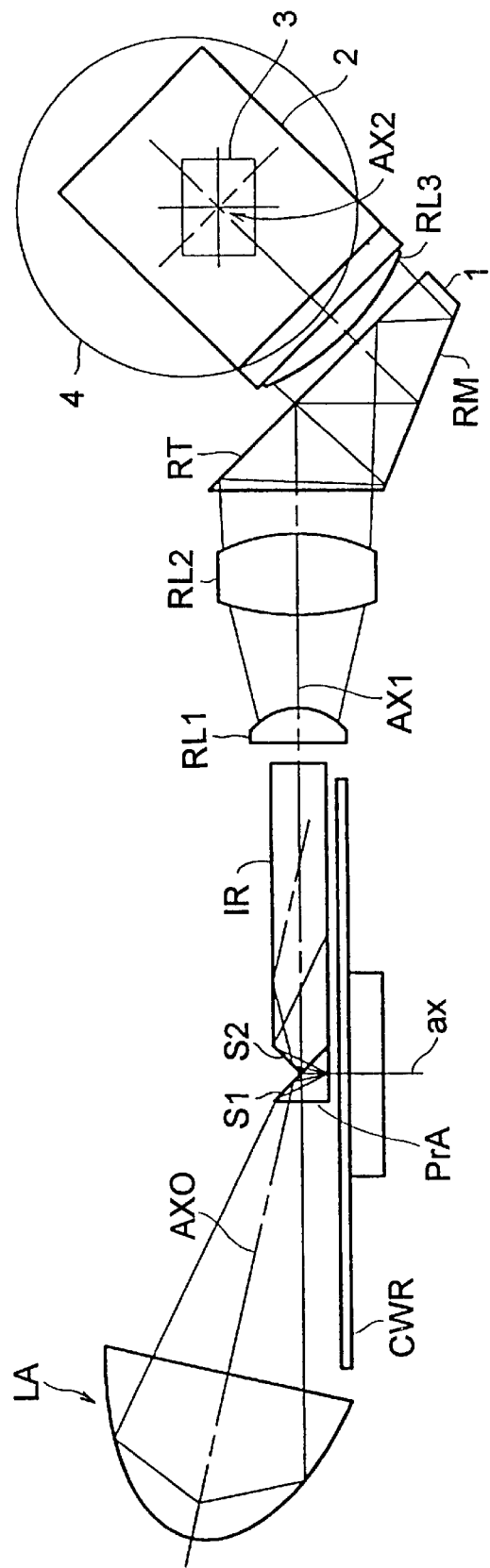
FIG. 16 is a front view showing the optical construction of the projector of a sixteenth embodiment of the invention.
Figure 17:
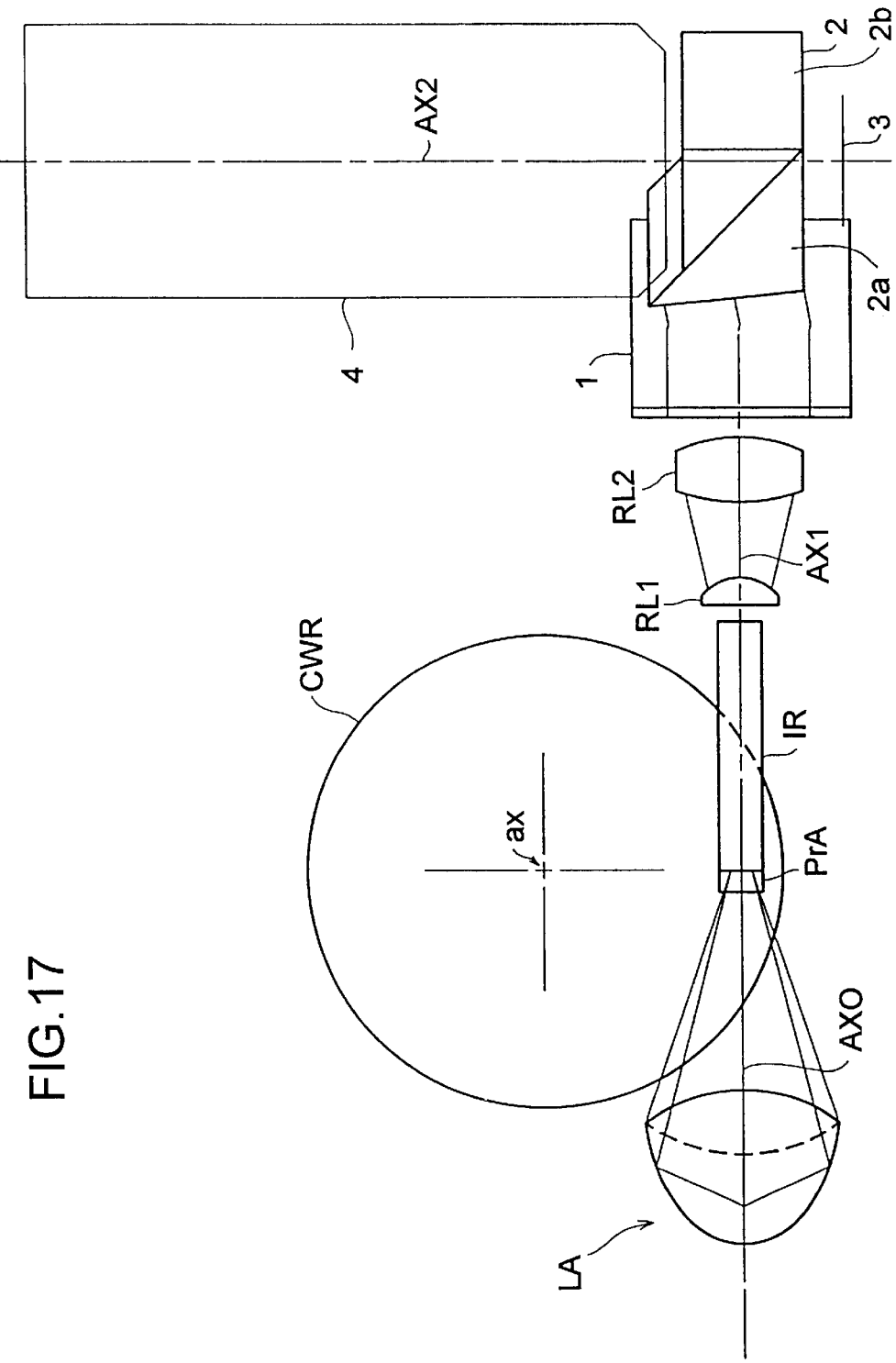
FIG. 17 is a top view showing the optical construction of the projector of the sixteenth embodiment of the invention.

Sixteenth Embodiment (No. 16, FIGS. 16 and 17)

FIGS. 16 and 17 show the projector of a sixteenth embodiment of the invention. FIG. 16 is a front view of the projector as seen from behind the DMD™ (3) provided therein, and FIG. 17 is a top view of the projector as seen from above. In the figures, AX1 represents the optical axis of illumination light and AX2 represents the optical axis of projection light. This projector incorporates the illumination system of the eleventh Embodiment (FIGS. 11A and 11B) described previously, and in addition has a DMD™ (3) for modulating the illumination light emitted from the illumination system and a projection optical system (4) for projecting as an image the light modulated by the DMD™ (3), which serves as a display device. The illumination system is composed of a lamp (LA), a reflection-type color wheel (CWR), a first deflecting prism (PrA), an integrator rod (IR), a first to a third relay lens (RL1~RL3) constituting a relay optical system (RL) as mentioned earlier, a turning prism (1), and a TIR prism (2).

The illumination light emitted from the lamp (LA) enters the first deflecting prism (PrA), is then reflected from a first reflecting surface (S1), and is then reflected from the color wheel (CWR). The color wheel (CWR) is composed of a plurality of color filters transmitting light of different colors (such as R, G, and B), and is so constructed as to rotate, by the action of a motor or the like, about a rotation axis (ax) in such a way that the DMD™ (3) is illuminated with light of colors sequentially switched with time. The illumination light reflected from the color wheel (CWR) enters the integrator rod (IR) and is reflected from a second reflecting surface (S2). While the illumination light is passing through the integrator rod (IR), its spatial energy distribution is made uniform, which helps eliminate the difference in brightness between axial and off-axial rays on the display surface of the DMD™ (3).

The illumination light having exited from the integrator rod (IR) passes through the first and second relay lenses (RL1, RL2), and then enters the turning prism (1) having the shape of a quadrangular prism. The illumination light having entered the turning prism (1) is totally reflected from the reflecting surface (RT), is then mirror-reflected from the reflecting surface (RM), and is then transmitted through the reflecting surface (RT) so as to exit from the turning prism (1). That is, the illumination light has its optical path bent obliquely upward at an obtuse angle by the two reflecting surfaces (RT and RM) inside the turning prism (1).

The illumination light having its optical path bent by the turning prism (1) passes through the third relay lens (RL3), and then enters the TIR prism (2), where the illumination light has its direction turned. The TIR prism (2) is composed of a first prism (2a) and a second prism (2b), and serves to separate light traveling toward and away from the DMD™ (3). To the first prism (2a), the third relay lens (RL3) is cemented so that the illumination light having passed through the third relay lens (RL3) directly enters the first prism (2a). The illumination light having entered the first prism (2a) is totally reflected from a reflecting surface facing the second prism (2b) those surfaces of the first prism (2a) and the second prism (2b) that face each other are arranged substantially parallel to each other with a predetermined air gap secured in between, and then illuminates the DMD™ (3) from an oblique direction at an angle of 45° relative thereto.

Then, the illumination light is optically modulated by being reflected from the DMD™ (3).

The DMD™ (3) has a display surface having a large number of micromirrors arranged in a matrix, with each micromirror constituting a pixel of a displayed image. To achieve light modulation, the inclination of the individual micromirrors is driven and controlled independently so that each micromirror is in one of two differently inclined states, namely either in an ON state or in an OFF state. The micromirrors in their ON state reflect the illumination light toward the inside of the projection optical system, and the micromirrors in their OFF state reflect the illumination light toward the outside of the projection optical system. Thus, the portion of the illumination light reflected by the micromirrors in their ON state travels through the TIR prism (2), i.e. first the first prism (2a) and then the second prism (2b), then enters the projection optical system (4), and eventually reaches a projection surface (for example, a screen surface), thereby forming a displayed image, which is a pattern consisting of differently bright spots, on the projection surface.

The illumination light entering the first deflecting prism (PrA) and the illumination light exiting from the integrator rod (IR) are both substantially perpendicular to the rotation axis (ax) of the color wheel (CWR). Therefore, in spite of having a large color wheel (CWR), the projector is slim and compact. In addition, the optical axis (AX2) of the projection system (4) and the rotation axis (ax) of the color wheel (CWR) are substantially perpendicular to each other. With the rotation axis (ax) of the color wheel (CWR) perpendicular to the optical axis (AX2) of the projection light, the color wheel (CWR) does not jut upward or downward. Thus, this relationship also helps make the entire projector slim.

As described above, the optical path of the illumination light before entering the TIR prism (2) is bent upward at an obtuse angle by the turning prism (1). This helps alleviate restrictions on component arrangement as imposed by the relay lenses (RL1, RL2). As a result, with the lamp (LA) arranged horizontally and thus having a smaller height, it is possible to realize a slim and compact projector. In addition, the turning prism (1) has one total-reflection surface (RT) and one mirror-reflection surface (RM), and the reflecting surface (RT) that totally reflects light is shared also an exiting surface that transmits light. By the use of this turning prism (1), in which both total reflection and mirror reflection occur, it is possible to permit an overlap of the optical path of the illumination light, and thereby shorten the optical path. This helps make the entire optical system compact, and eliminate the need for a large reflecting surface.

Figure 18:
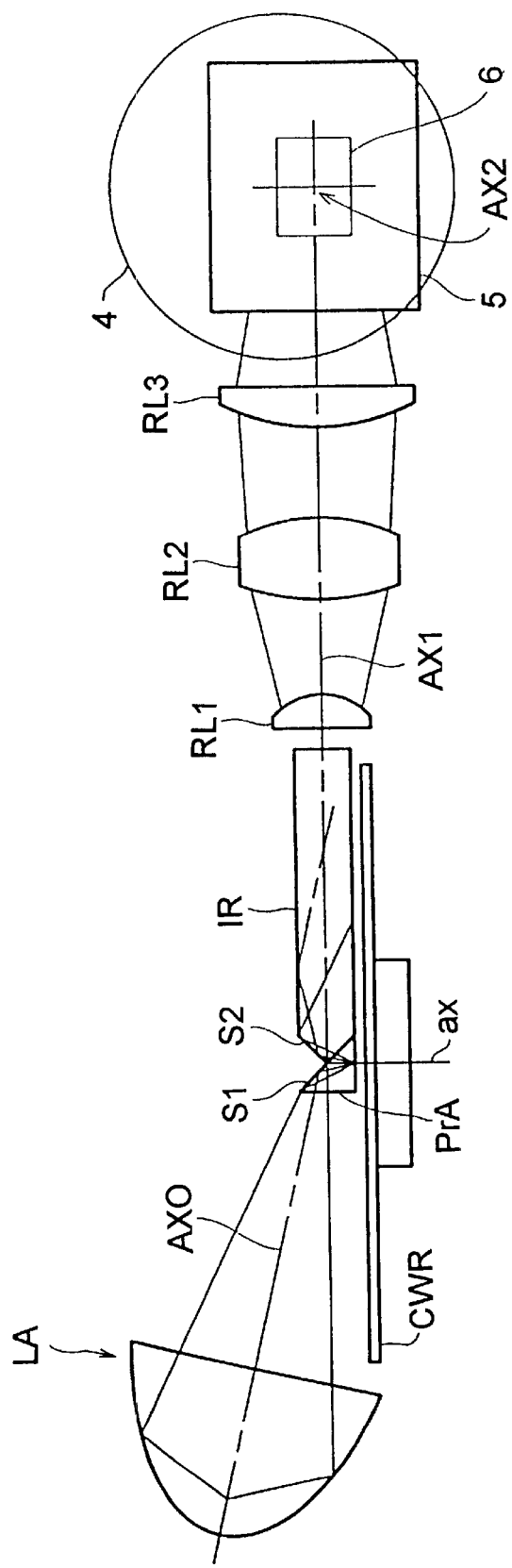
FIG. 18 is a front view showing the optical construction of the projector of a seventeenth embodiment of the invention.
Figure 19:
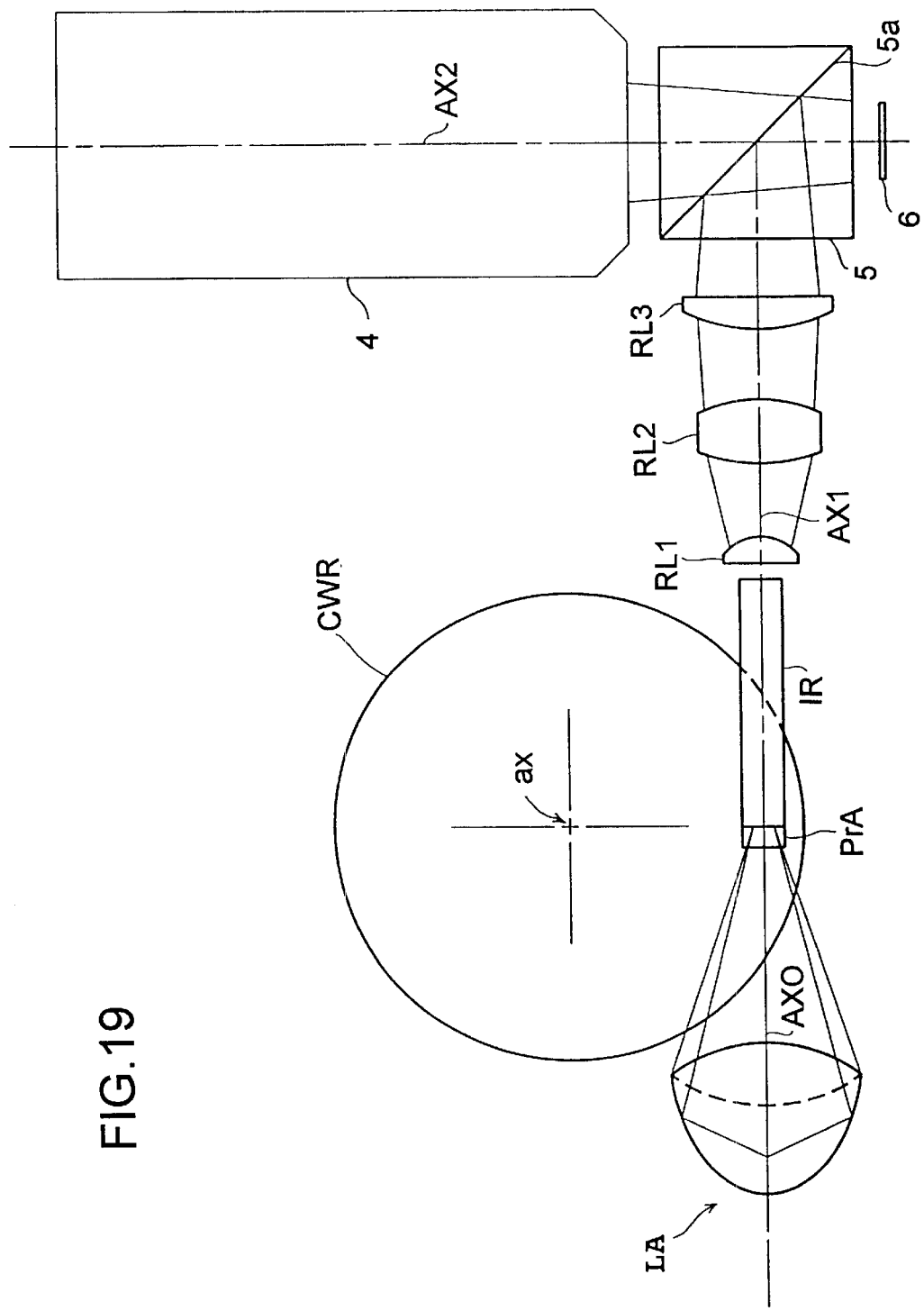
FIG. 19 is a top view showing the optical construction of the projector of the seventeenth embodiment of the invention.

Seventeenth Embodiment (FIGS. 18 and 19)

FIGS. 18 and 19 show the projector of a seventeenth embodiment of the invention. FIG. 18 is a front view of the projector as seen from behind the liquid crystal device (6) provided therein, and FIG. 19 is a top view of the projector as seen from above. This projector incorporates the illumination system of the eleventh Embodiment (FIGS. 11A and 11B) described previously, and in addition has a reflection-type liquid crystal device (6) for modulating the illumination light emitted from the illumination system and a projection optical system (4) for projecting as an image the light modulated by the liquid crystal device (6), which serves as a display device. The illumination system is composed of a lamp (LA), a reflection-type color wheel (CWR), a first deflecting prism (PrA), an integrator rod (IR), a first to a third relay lens (RL1~RL3) constituting a relay optical system (RL) as mentioned earlier, and a polarization beam splitter (PBS)(5).

The illumination light emitted from the lamp (LA) enters the first deflecting prism (PrA), is then reflected from a first reflecting surface (S1), and is then reflected from the color wheel (CWR). The color wheel (CWR) is composed of a plurality of color filters transmitting light of different colors (such as R, G, and B), and is so constructed as to rotate, by the action of a motor or the like, about a rotation axis (ax) in such a way that the liquid crystal device (6) is illuminated with light of colors sequentially switched with time. The illumination light reflected from the color wheel (CWR) enters the integrator rod (IR) and is reflected from a second reflecting surface (S2). While the illumination light is passing through the integrator rod (IR), its spatial energy distribution is made uniform, which helps eliminate the difference in brightness between axial and off-axial rays on the display surface of the liquid crystal device (6).

The illumination light having exited from the integrator rod (IR) passes through the first to third relay lenses (RL1~RL3), and then enters the polarization beam splitter (5). The illumination light having entered the polarization beam splitter (5) is split into S-polarized light and P-polarized light by a polarization separation surface (5a) shown in FIG. 19. The S-polarized illumination light is reflected from the polarization separation surface (5a), then exits from the polarization beam splitter (5), and then illuminates the liquid crystal device (6) perpendicularly. The illumination light entering the liquid crystal device (6) is modulated by being selectively reflected so as to be either P-polarized (at ON-state pixels) or S-polarized (at OFF-state pixels) according to the display state of each pixel. The light P-polarized and S-polarized reflected regularly and perpendicularly from the liquid crystal device (6) reenters the polarization beam splitter (5). The polarization beam splitter (5) reflects S-polarized light and transmits P-polarized light, and therefore only the light converted into P-polarized light by the liquid crystal device (6) enters, as projection light, the projection optical system (4). The projection light (P-polarized) transmitted through the polarization beam splitter (5) passes through the projection optical system (4) so as to be focused on a projection surface such as a screen.

As in the sixteenth Embodiment (FIGS. 16 and 17) described earlier, the illumination light entering the first deflecting prism (PrA) and the illumination light exiting from the integrator rod (IR) are both substantially perpendicular to the rotation axis (ax) of the color wheel (CWR). In addition, the optical axis (AX2) of the projection optical system (4) and the rotation axis (ax) of the color wheel (CWR) are substantially perpendicular to each other. Thus, also in this embodiment, it is possible to obtain a slim projector as in the sixteenth embodiment.

Figure 20:
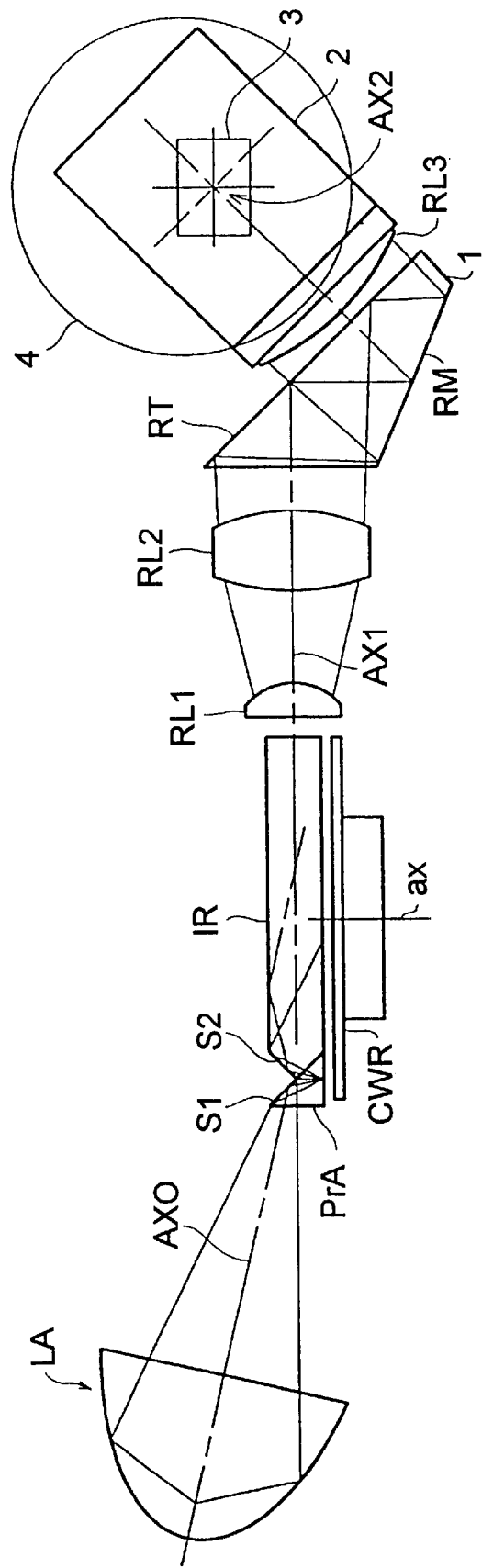
FIG. 20 is a front view showing the optical construction of the projector of an eighteenth embodiment of the invention.
Figure 21:
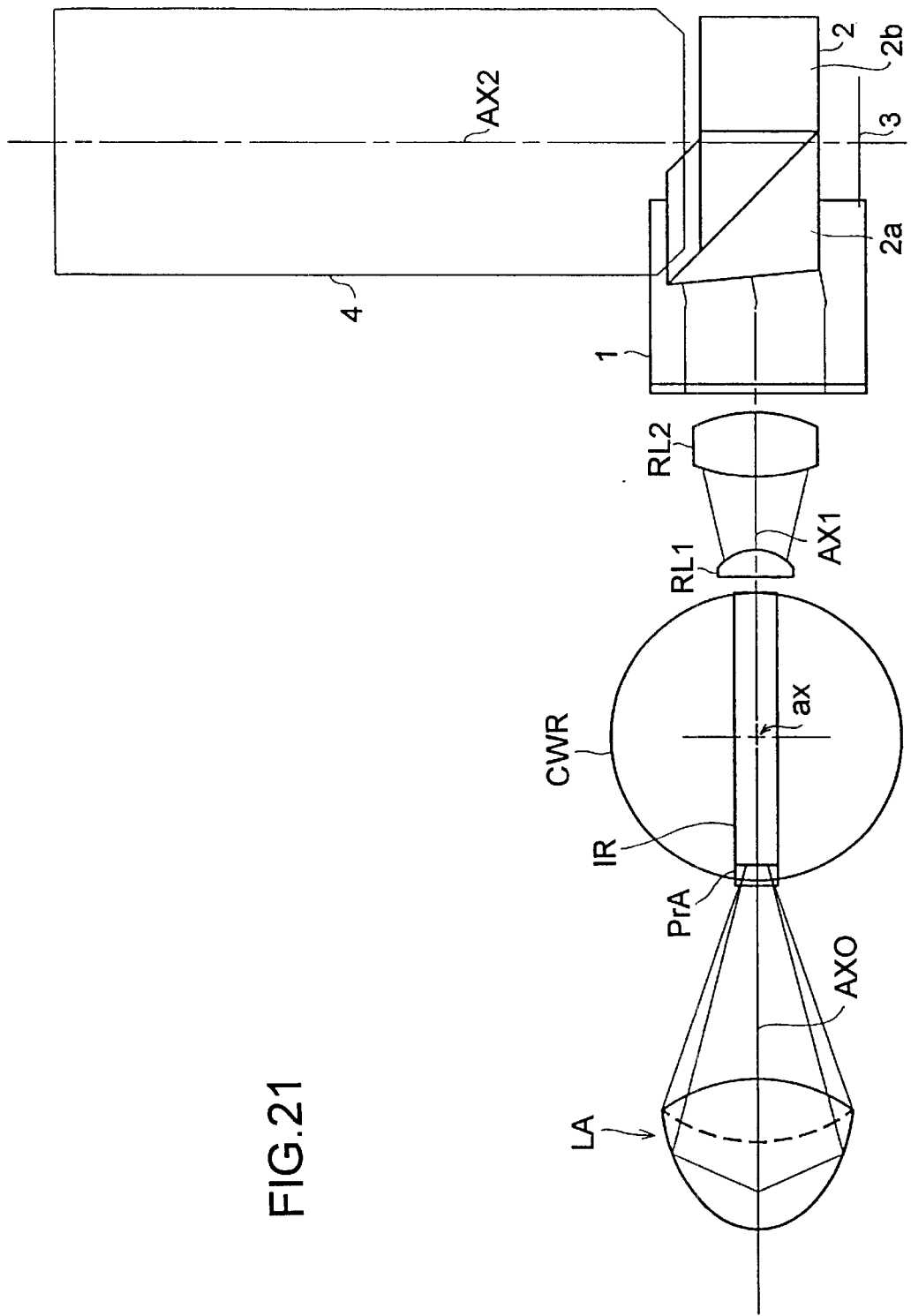
FIG. 21 is a top view showing the optical construction of the projector of the eighteenth embodiment of the invention.

Eighteenth Embodiment (FIGS. 20 and 21)

FIGS. 20 and 21 show the projector of an eighteenth embodiment. FIG. 20 is a front view of the projector as seen from behind the "DMD™ (3) provided therein, and FIG. 21 is a top view of the projector as seen from above. The distinctive feature of this embodiment is that the color wheel (CWR) is of substantially the same size as the integrator rod (IR) and is so arranged as to lie over the integrator rod (IR). In other respects, the construction here is the same as in the sixteenth Embodiment (FIGS. 16 and 17). By arranging a compact reflection-type color wheel (CWR) horizontally over the integrator rod (IR), it is possible to save space. The thus saved space can be used as the space for arranging electrical components, and thus helps make the entire projector smaller.

Figure 22A:
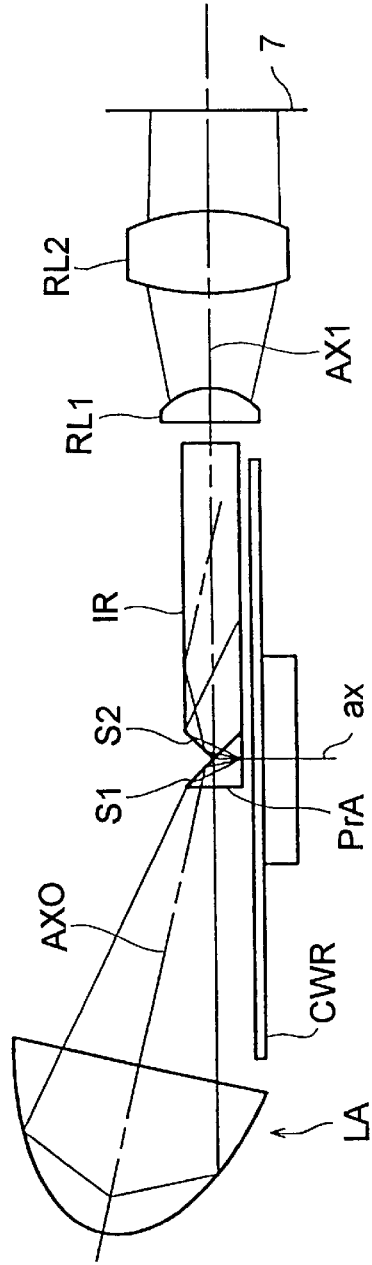
FIGS. 22A and 22B are front views showing the optical construction of the projector of a nineteenth embodiment of the invention.
Figure 22B:
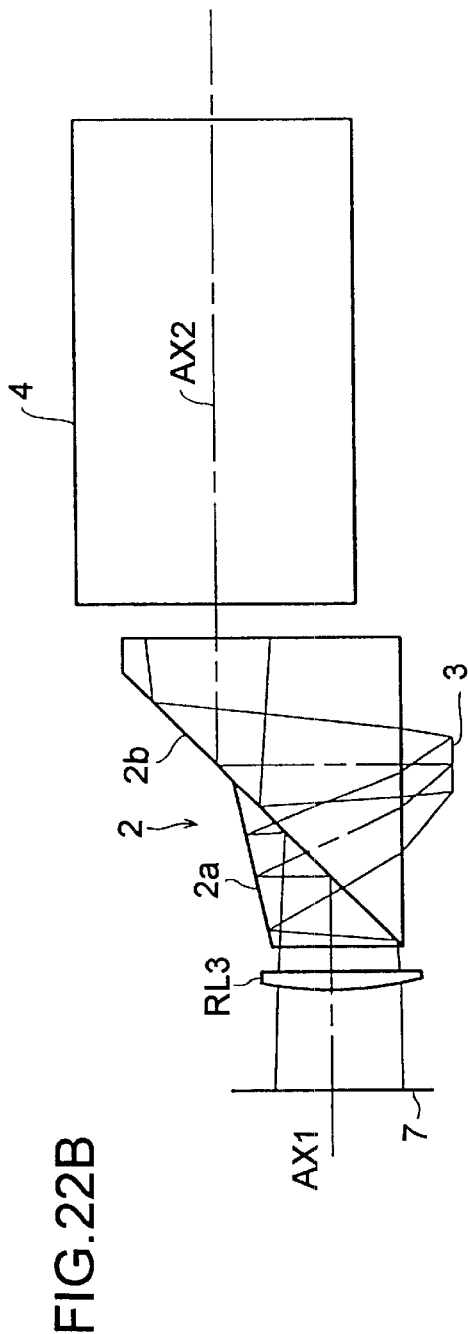
Figure 23:
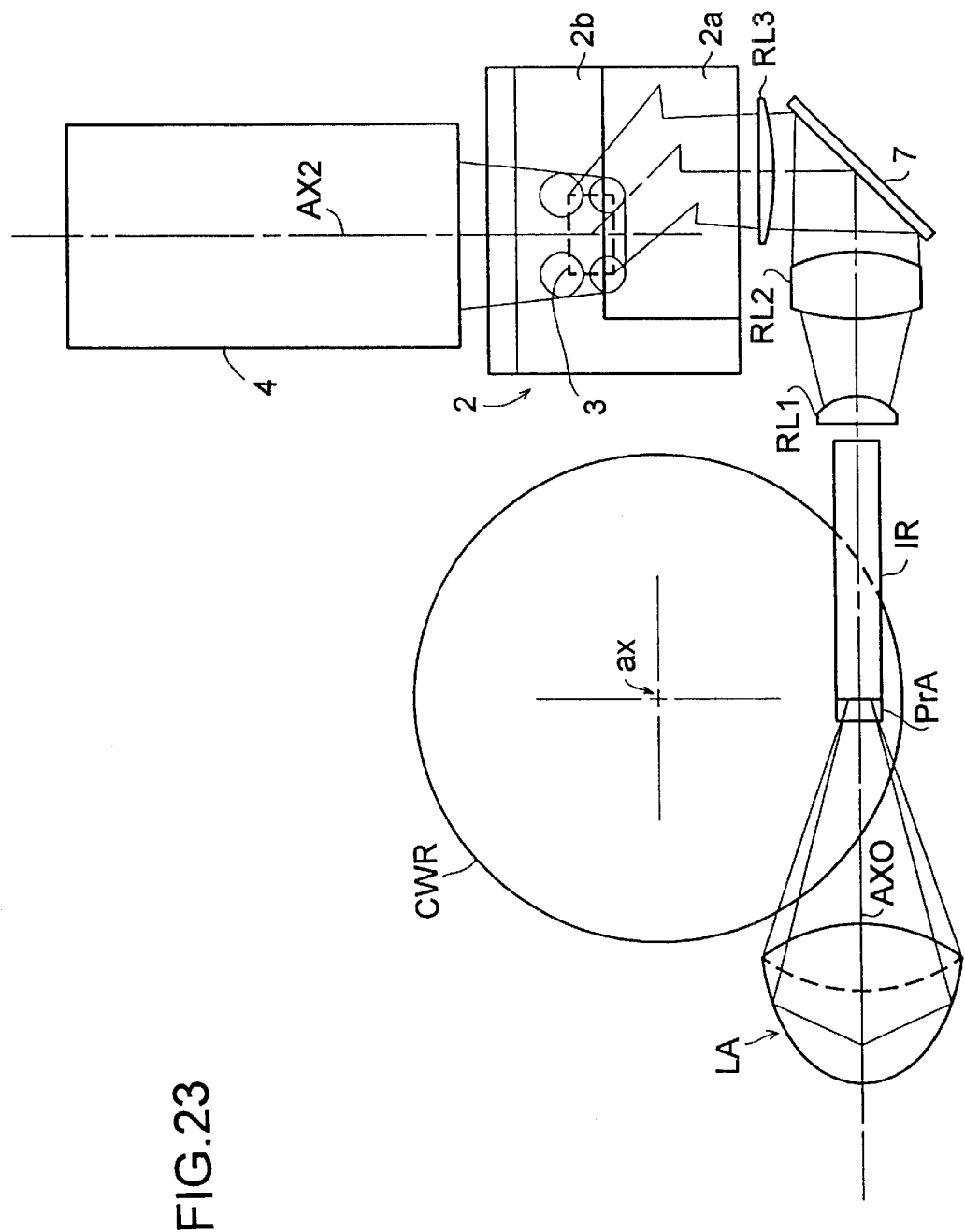
FIG. 23 is a top view showing the optical construction of the projector of the nineteenth embodiment of the invention.
Figure 24:
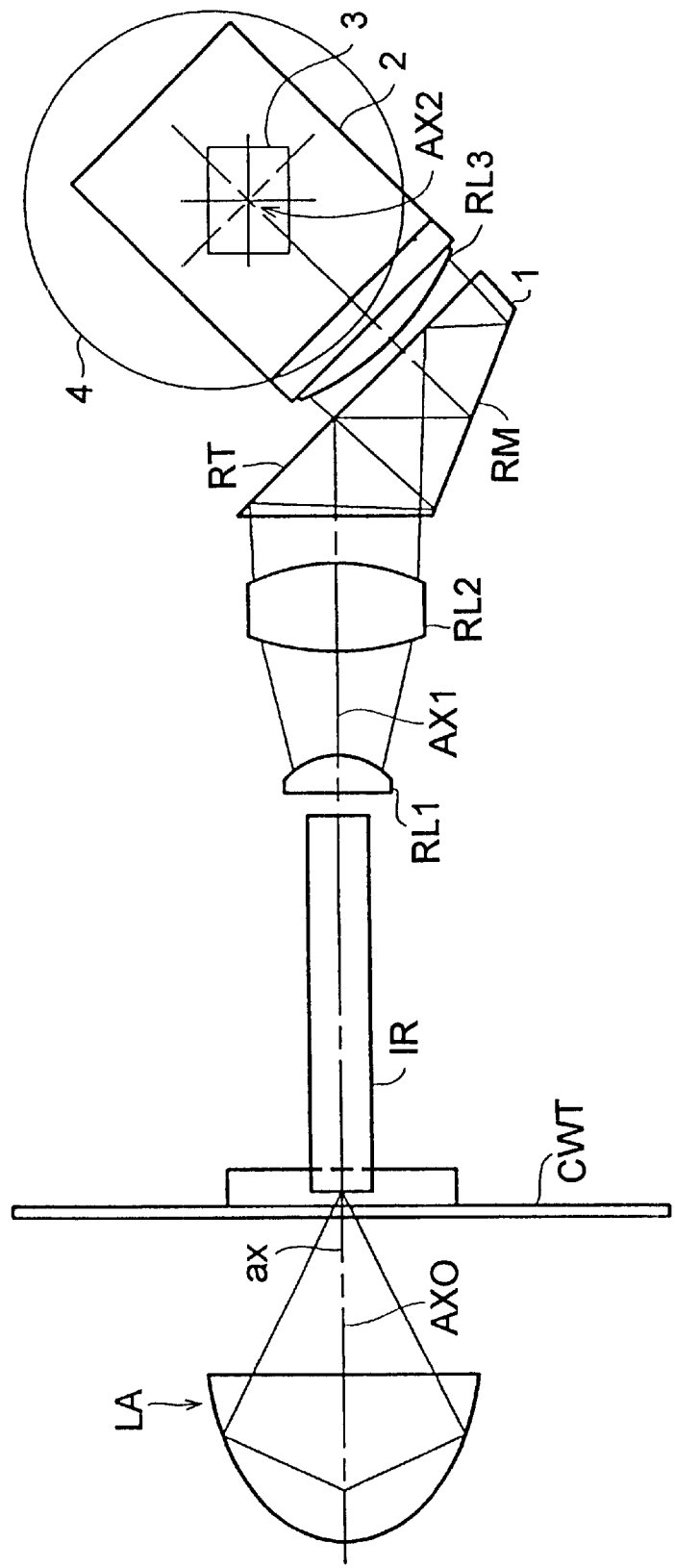
FIG. 24 is a front view showing the optical construction of a conventional projector.
Figure 25:
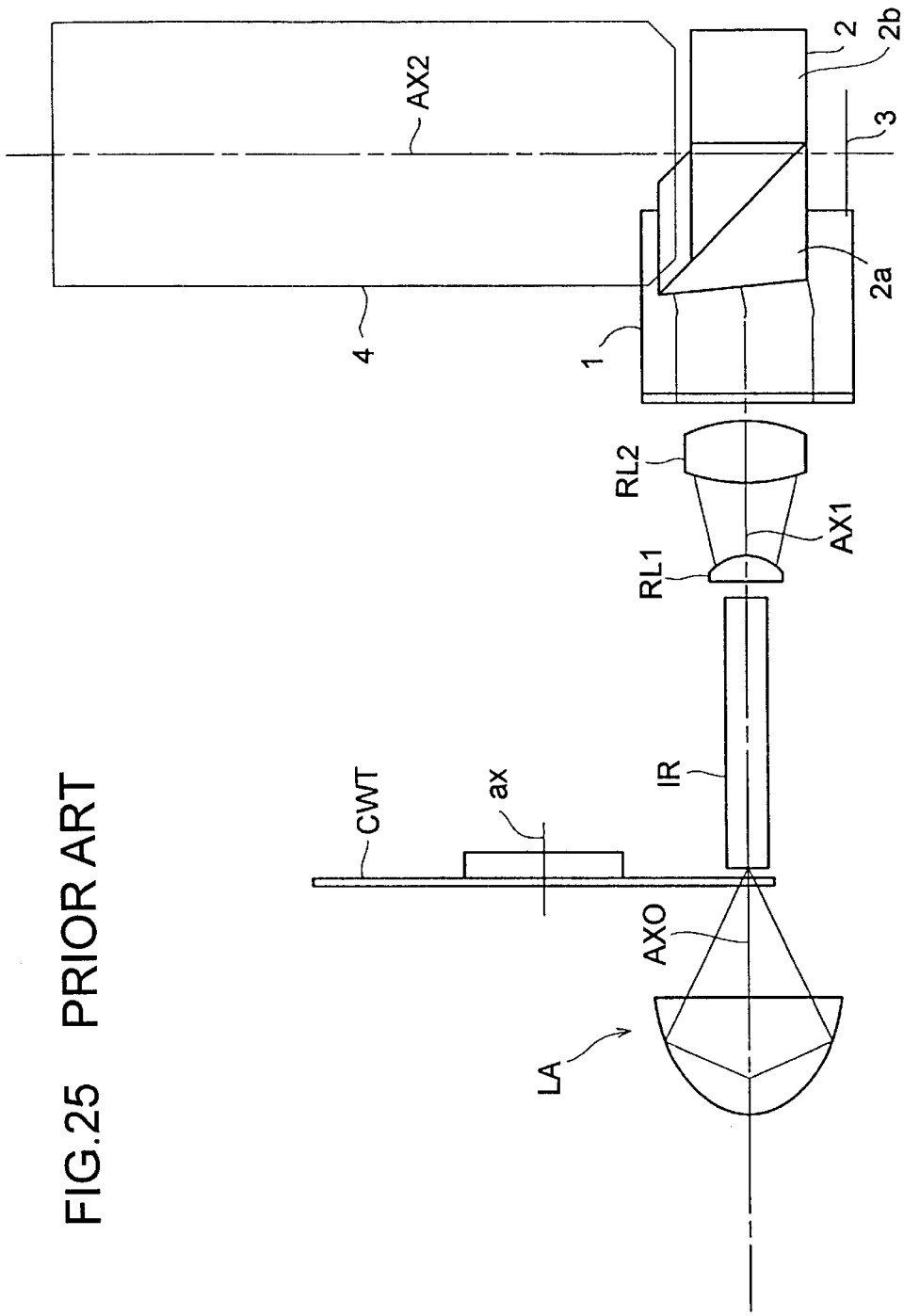
FIG. 25 is a top view showing the optical construction of the conventional projector shown in FIG. 24.
Figure 26A:
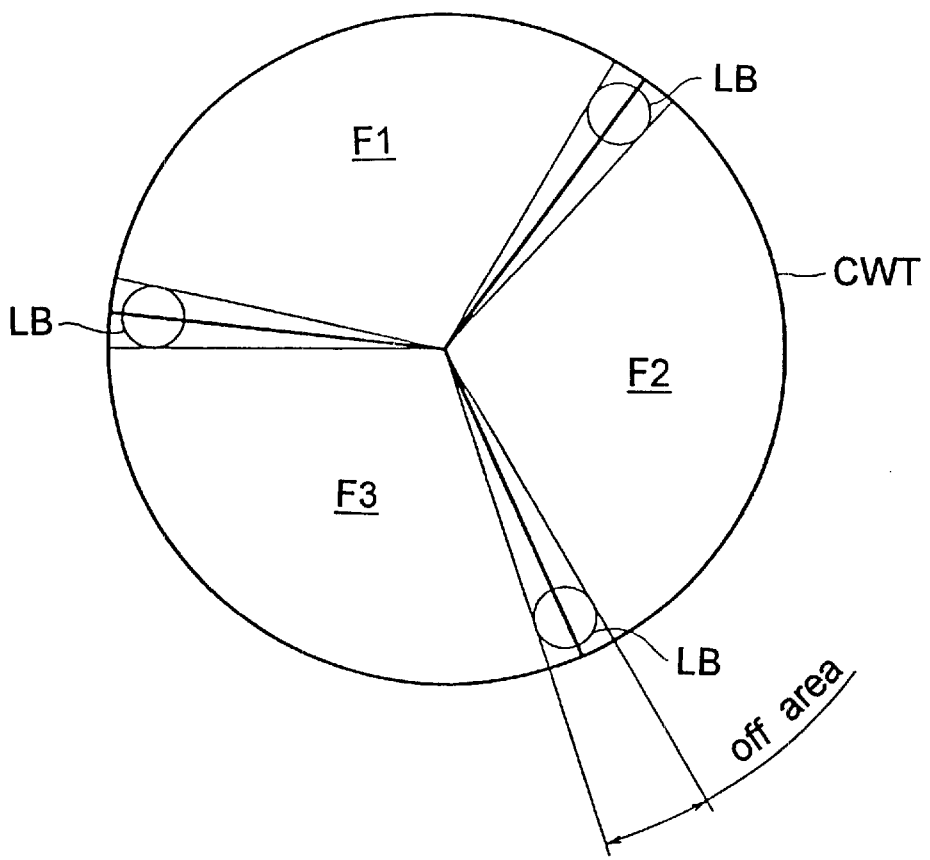
FIGS. 26A and 26B are optical path diagrams illustrating the relationship between the size of the color wheel and the ratio of the angle of the area on the color wheel struck by the illumination light.
Figure 26B:
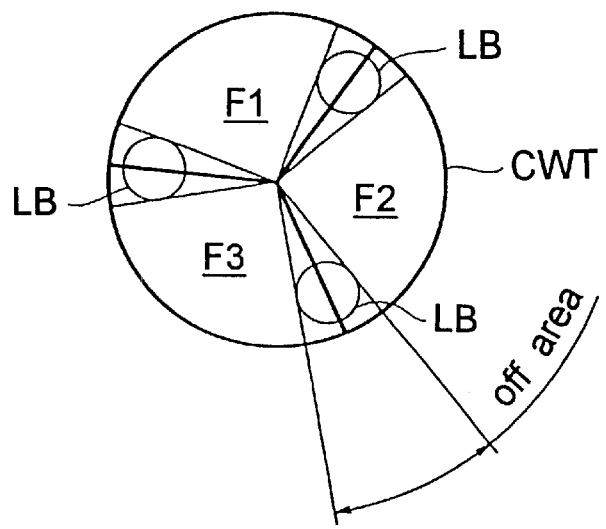

Nineteenth Embodiment (FIGS. 22A, 22B, and 23)

FIGS. 22A, 22B, and 23 show the projector of a nineteenth embodiment. FIGS. 22A and 22B are front views of the projector as seen from the side of the DMD™ (3) provided therein. FIG. 22A shows the arrangement from a lamp (LA) to a flat mirror (7) and FIG. 22B shows the arrangement from the flat mirror (7) to a projection optical system (4). FIG. 23 is a top view of the projector as seen from the front of the DMD™ (3). This projector incorporates the illumination system of the eleventh Embodiment (FIGS. 11A and 11B), described earlier, and in addition has a DMD™ (3), and a projection optical system (4). The illumination system is composed of a lamp (LA), a reflection-type color wheel (CWR), a first deflecting prism (PrA), an integrator rod (IR), a first to a third relay lens (RL1~RL3) constituting a relay optical system (RL) as mentioned earlier, a flat mirror (7), and a TIR prism (2).

The illumination light emitted from the lamp (LA) follows the same optical path as in the sixteenth Embodiment (FIGS. 16 and 17) described earlier until it exits from the second relay lens (RL2), and is then reflected from the flat mirror (7) shown in FIG. 23. The illumination light having its optical path bent by the flat mirror (7) passes through the third relay lens (RL3), and then has its direction turned in the TIR prism (2). The illumination light having entered a first prism (2a) is totally reflected as shown in FIG. 22B, and is then transmitted through a second prism (2b) so as to illuminates the DMD™ (3) from an oblique direction at an angle of 45° relative thereto. Then, the illumination light is optically modulated by being reflected from the DMD™ (3), is then totally reflected in the second prism (2b), and then enters the projection optical system (4) so as to form a display image on a projection surface.

In this embodiment, as well as the color wheel (CWR), the DMD™ (3) is also arranged horizontally. This helps make the projector even slimmer. The base plate that holds the DMD™ (3) can also be arranged horizontally together with the DMD™ (3), and therefore, even if the DMD™ (3) itself is small, it is possible to effectively make the entire projector slimmer.

What is claimed is:

1. An illumination system comprising:
   a light source for emitting illumination light;
   a color wheel that reflects the illumination light while rotating about a rotation axis in such a way that illumination light exiting from the color wheel has colors that are switched sequentially with time;
   a first deflecting member for deflecting the illumination light in such a way that the illumination light enters the color wheel; and
   a second deflecting member for deflecting the illumination light having exited from the color wheel,
   wherein the illumination light entering the first deflecting member and the illumination light exiting from the second deflecting member are both substantially perpendicular to the rotation axis of the color wheel.

2. An illumination system as claimed in claim 1, wherein the color wheel is of a reflection type.

3. An illumination system as claimed in claim 1, wherein at least one of the first and second deflecting members is a flat mirror.

4. An illumination system as claimed in claim 1, wherein at least one of the first and second deflecting members is a prism having a mirror-reflection surface.

5. An illumination system as claimed in claim 1, wherein at least one of the first and second deflecting members is a prism having a total-reflection surface.

6. An illumination system as claimed in claim 1, wherein the first and the second deflecting members are TIR prisms.

7. An illumination system as claimed in claim 1, wherein an integrator rod is disposed in an optical path.

8. An illumination system as claimed in claim 1, wherein the light source is a combination of a lamp and a paraboloid mirror serving as a reflector.

9. An illumination system as claimed in claim 8, wherein the reflector further includes a flat mirror.

10. An illumination system as claimed in claim 1, wherein the light source is a combination of a lamp and an ellipsoid mirror serving as a reflector.

11. An illumination system as claimed in claim 10, wherein the reflector further includes a spherical mirror.

12. An illumination system comprising:
    a light source for emitting illumination light;
    a color wheel that transmits the illumination light while rotating about a rotation axis in such a way that illumination light exiting from the color wheel has colors that are switched sequentially with time;
    a first deflecting member for deflecting the illumination light in such a way that the illumination light enters the color wheel, and
    a second deflecting member for deflecting the illumination light having exited from the color wheel,
    wherein the illumination light deflected by the first deflecting member is substantially equivalent to the illumination light received by the color wheel;
    wherein the illumination light entering the first deflecting member and the illumination light exiting from the second deflecting member are both substantially perpendicular to the rotation axis of the color wheel; and
    wherein the color wheel is of a transmission type.

13. An illumination system as claimed in claim 12, wherein at least one of the first and second deflecting members is a flat mirror.

14. An illumination system as claimed in claim 12, wherein at least one of the first and second deflecting members is a prism having a mirror-reflection surface.

15. An illumination system as claimed in claim 12, wherein at least one of the first and second deflecting members is a prism having a total-reflection surface.

16. An illumination system as claimed in claim 12, wherein the first and the second deflecting members are TIR prisms.

17. An illumination system as claimed in claim 12, wherein an integrator rod is disposed in an optical path.

18. An illumination system as claimed in claim 12, wherein the light source is a combination of a lamp and a paraboloid mirror serving as a reflector.

19. An illumination system as claimed in claim 18, wherein the reflector further includes a flat mirror.

20. An illumination system as claimed in claim 12, wherein the light source is a combination of a lamp and an ellipsoid mirror serving as a reflector.

21. An illumination system as claimed in claim 20, wherein the reflector further includes a spherical mirror.

22. A projector comprising:
    a light source for emitting illumination light;
    a color wheel that transmits or reflects the illumination light while rotating about a rotation axis in such a way that illumination light exiting from the color wheel has colors that are switched sequentially with time;
    a first deflecting member for deflecting the illumination light in such a way that the illumination light enters the color wheel;

a second deflecting member for deflecting the illumination light having exited from the color wheel, a spatial light modulation device that is illuminated with the illumination light exiting from the color wheel and that modulates illumination light so as to emit the modulated illumination light as an image light; and a projection optical system for projecting the image light modulated by the spatial light modulation device onto a projection surface located at a predetermined distance, wherein the rotation axis of the color wheel and an optical axis of the projection optical system are substantially perpendicular to each other; and wherein the illumination light entering the first deflecting member and the illumination light exiting from the second deflecting member are both substantially perpendicular to the rotation axis of the color wheel.

23. A projector as claimed in claim 22, wherein the spatial light modulation device is a reflection-type liquid crystal display device.

24. A projector as claimed in claim 22, wherein the spatial light modulation device is a Digital Micromirror Device™.

25. A projector as claimed in claim 22, wherein the rotation axis of the color wheel and an optical axis of the projection optical system are substantially perpendicular to each other.

26. A projector comprising:

a light source for emitting illumination light;

a color wheel that reflects the illumination light while rotating about a rotation axis in such a way that illumination light exiting from the color wheel has colors that are switched sequentially with time;

a first deflecting member for deflecting the illumination light in such a way that the illumination light enters the color wheel, a second deflecting member for deflecting the illumination light reflected from the color wheel, a spatial light modulation device that is illuminated with the illumination light exiting from the color wheel and that modulates illumination light so as to emit the modulated illumination light as an image light; and a projection optical system for projecting the image light modulated by the spatial light modulation device onto a projection surface located at a predetermined distance, wherein the illumination light entering the first deflecting member and the illumination light exiting from the second deflecting member are both substantially perpendicular to the rotation axis of the color wheel.

27. A projector comprising:

a light source for emitting illumination light;

a color wheel that transmits the illumination light while rotating about a rotation axis in such a way that illumination light exiting from the color wheel has colors that are switched sequentially with time;

a first deflecting member for deflecting the illumination light in such a way that the illumination light enters the color wheel;

a second deflecting member for deflecting the illumination light having exited from the color wheel, a spatial light modulation device that is illuminated with the illumination light exiting from the color wheel and that modulates illumination light so as to emit the modulated illumination light as an image light; and a projection optical system for projecting the image light modulated by the spatial light modulation device onto a projection surface located at a predetermined distance, wherein the illumination light deflected by the first deflecting member is substantially equivalent to the illumination light received by the color wheel;

wherein the illumination light entering the first deflecting member and the illumination light exiting from the second deflecting member are both substantially perpendicular to the rotation axis of the color wheel; and wherein the color wheel is of a transmission type.

* * * * *

UNITED STATES PATENT AND TRADEMARK OFFICE
CERTIFICATE OF CORRECTION

PATENT NO.     : 6,478,431 B1
DATED          : November 12, 2002
INVENTOR(S)    : Shigeru Sawamura et al.

It is certified that error appears in the above-identified patent and that said Letters Patent is hereby corrected as shown below:

Column 16,
Lines 10 and 12, (the continuation of TABLE 1), under the category "Reflector", delete "Ellipsoid Mirror", and insert -- Paraboloid Mirror --.
Line 17, (the continustion of TABLE 1), under the category "Reflector", delete "Plane Mirror", and insert -- Spherical Mirror --.

Signed and Sealed this

Thirtieth Day of March, 2004

JON W. DUDAS
*Acting Director of the United States Patent and Trademark Office*